(12) United States Patent
Hoffer et al.

(10) Patent No.: US 11,324,281 B2
(45) Date of Patent: May 10, 2022

(54) PARTICULATE FOAM STACKED CASINGS

(71) Applicant: NIKE, Inc., Beaverton, OR (US)

(72) Inventors: Kevin W. Hoffer, Portland, OR (US);
Cassidy R. Levy, West Linn, OR (US);
Nicholas R. Long, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 355 days.

(21) Appl. No.: 16/327,589

(22) PCT Filed: Sep. 23, 2016

(86) PCT No.: PCT/US2016/053240
§ 371 (c)(1),
(2) Date: Feb. 22, 2019

(87) PCT Pub. No.: WO2017/053654
PCT Pub. Date: Mar. 30, 2017

(65) Prior Publication Data
US 2019/0223539 A1     Jul. 25, 2019

Related U.S. Application Data

(60) Provisional application No. 62/222,842, filed on Sep. 24, 2015, provisional application No. 62/222,873, (Continued)

(51) Int. Cl.
*A43B 13/14* (2006.01)
*A43B 13/12* (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ....... A43B 7/32; A43B 13/122; A43B 13/125; A43B 13/127; A43B 13/16; A43B 13/181;
(Continued)

(56) References Cited

U.S. PATENT DOCUMENTS

| | | | | |
|---|---|---|---|---|
| 580,501 A | * | 4/1897 | Mobberley | ............ A43B 13/20 36/29 |
| 1,240,153 A | * | 9/1917 | Olsen | ..................... A43B 21/32 36/37 |

(Continued)

FOREIGN PATENT DOCUMENTS

| | | |
|---|---|---|
| CH | 283034 A | 5/1952 |
| CN | 1053884 A | 8/1991 |

(Continued)

OTHER PUBLICATIONS

European Patent Office as The International Searching Authority, International Search Report and Written Opinion for PCT Application No. PCT/US2016/053256, dated Jan. 12, 2017.

(Continued)

*Primary Examiner* — Ted Kavanaugh
(74) *Attorney, Agent, or Firm* — Honigman LLP; Matthew H. Szalach; Jonathan P. O'Brien

(57) ABSTRACT

An article of footwear includes an upper, a midsole attached to the upper, and an outsole. The midsole has a footbed and a bottom surface disposed on an opposite side of the midsole than the footbed. The outsole has a ground-engaging surface, an inner surface disposed on an opposite side of the outsole than the ground-engaging surface, and a wall extending from the ground-engaging surface and surrounding the outsole. The article of footwear also includes at least two casings each containing particulate matter and having a thickness extending substantially perpendicular to a longitudinal axis of the outsole. The at least two casings are
(Continued)

arranged in a layered configuration and received within a cavity bounded by the wall of the outsole and between the bottom surface and the inner surface.

19 Claims, 18 Drawing Sheets

Related U.S. Application Data filed on Sep. 24, 2015, provisional application No. 62/222,882, filed on Sep. 24, 2015, provisional application No. 62/222,851, filed on Sep. 24, 2015, provisional application No. 62/222,832, filed on Sep. 24, 2015, provisional application No. 62/222,816, filed on Sep. 24, 2015.

(51) Int. Cl.

| | | |
|---|---|---|
| *A43B 13/18* | (2006.01) | |
| *A43B 13/20* | (2006.01) | |
| *A43B 1/00* | (2006.01) | |
| *A43B 13/04* | (2006.01) | |
| *A43B 5/00* | (2022.01) | |
| *A43B 13/16* | (2006.01) | |
| *B32B 5/16* | (2006.01) | |
| *B32B 5/18* | (2006.01) | |
| *B32B 25/04* | (2006.01) | |
| *B32B 25/14* | (2006.01) | |
| *A43B 7/1405* | (2022.01) | |
| *A43B 7/32* | (2006.01) | |

(52) U.S. Cl.
CPC .............. *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(58) Field of Classification Search
CPC ... A43B 13/186; A43B 13/187; A43B 13/188; A43B 13/189; A43B 13/20; A43B 13/04
See application file for complete search history.

(56) References Cited

U.S. PATENT DOCUMENTS

| | | | |
|---|---|---|---|
| 2,930,149 A | 3/1960 | Hack | |
| 3,087,262 A | 4/1963 | Russell | |
| 3,469,576 A | 9/1969 | Smith et al. | |
| 3,552,044 A | 1/1971 | Wiele | |
| 3,608,215 A | 9/1971 | Fukuoka | |
| 3,765,422 A | 10/1973 | Smith | |
| 3,906,570 A | 9/1975 | Revill | |
| 3,971,839 A | 7/1976 | Taylor | |
| 4,016,662 A * | 4/1977 | Thompson | A43B 13/203 |
| | | | 36/29 |
| 4,170,078 A | 10/1979 | Moss | |
| 4,307,200 A | 12/1981 | Lichter et al. | |
| 4,343,047 A | 8/1982 | Lazowski et al. | |
| 4,345,387 A | 8/1982 | Daswick | |
| 4,524,529 A | 6/1985 | Schaefer | |
| 4,658,515 A | 4/1987 | Oatman | |
| 4,686,781 A | 8/1987 | Bury | |
| 4,724,627 A | 2/1988 | Sisco | |
| 4,779,359 A * | 10/1988 | Famolare, Jr. | A43B 13/20 |
| | | | 36/28 |
| 4,823,799 A | 4/1989 | Robbins | |
| 4,905,320 A | 3/1990 | Squyers, Jr. | |
| 4,970,807 A | 11/1990 | Anderie et al. | |
| 5,005,575 A | 4/1991 | Geri | |
| 5,097,607 A * | 3/1992 | Fredericksen | A43B 17/03 |
| | | | 36/29 |
| 5,150,490 A | 9/1992 | Busch et al. | |
| 5,199,191 A * | 4/1993 | Moumdjian | A43B 13/203 |
| | | | 36/25 R |
| 5,231,776 A | 8/1993 | Wagner | |
| 5,363,570 A | 11/1994 | Allen et al. | |
| 5,378,223 A | 1/1995 | Grim et al. | |
| 5,383,290 A | 1/1995 | Grim | |
| 5,392,534 A | 2/1995 | Grim | |
| 5,517,770 A | 5/1996 | Martin et al. | |
| 5,617,650 A | 4/1997 | Grim | |
| 5,665,285 A | 9/1997 | Hattori et al. | |
| 5,718,064 A | 2/1998 | Pyle | |
| 5,753,357 A | 5/1998 | Filipitsch et al. | |
| 5,758,435 A | 6/1998 | Miyata | |
| 5,920,915 A | 7/1999 | Bainbridge et al. | |
| 5,987,781 A | 11/1999 | Pavesi et al. | |
| 6,020,055 A | 2/2000 | Pearce | |
| 6,032,300 A | 3/2000 | Bainbridge et al. | |
| 6,061,928 A | 5/2000 | Nichols | |
| 6,098,209 A | 8/2000 | Bainbridge et al. | |
| 6,158,149 A | 12/2000 | Rudy | |
| 6,266,896 B1 | 7/2001 | Liu | |
| D460,852 S | 7/2002 | Daudier | |
| 6,453,477 B1 | 9/2002 | Bainbridge et al. | |
| 6,502,331 B2 | 1/2003 | Hines | |
| 6,532,689 B1 | 3/2003 | Jones, Jr. | |
| 6,635,203 B2 | 10/2003 | Monaci | |
| 6,759,443 B2 | 7/2004 | Brant et al. | |
| 6,782,640 B2 | 8/2004 | Westin | |
| 6,848,200 B1 | 2/2005 | Westin | |
| 6,878,753 B1 | 4/2005 | Takemura et al. | |
| 7,037,571 B2 | 5/2006 | Fish et al. | |
| 7,069,672 B2 | 7/2006 | Hahn | |
| 7,152,342 B2 | 12/2006 | Sommer | |
| 7,484,318 B2 | 2/2009 | Finkelstein | |
| 7,555,851 B2 | 7/2009 | Hazenberg et al. | |
| 7,594,344 B2 | 9/2009 | Mizrahi | |
| 7,805,859 B2 | 10/2010 | Finkelstein | |
| 7,810,255 B2 * | 10/2010 | Schindler | A43B 13/20 |
| | | | 36/29 |
| 7,823,238 B2 | 11/2010 | Din Mahamed | |
| 7,904,971 B2 | 3/2011 | Doria et al. | |
| 8,091,254 B2 | 1/2012 | Wang | |
| 8,178,022 B2 | 5/2012 | Schindler et al. | |
| 8,272,149 B2 | 9/2012 | Cooper et al. | |
| 8,671,591 B2 | 3/2014 | Brown | |
| 8,713,817 B2 | 5/2014 | Litchfield et al. | |
| 8,943,709 B2 * | 2/2015 | Aveni | A43B 13/189 |
| | | | 36/35 B |
| 2001/0000835 A1 | 5/2001 | Hines | |
| 2003/0046831 A1 | 3/2003 | Westin | |
| 2005/0022424 A1 | 2/2005 | Held | |
| 2005/0086728 A1 | 4/2005 | Tobergte | |
| 2005/0150132 A1 | 7/2005 | Iannacone | |
| 2006/0010717 A1 | 1/2006 | Finkelstein | |
| 2006/0026863 A1 | 2/2006 | Liu | |
| 2006/0130363 A1 | 6/2006 | Hottinger | |
| 2006/0206977 A1 | 9/2006 | Hammons et al. | |
| 2007/0051018 A1 | 3/2007 | Issler | |
| 2007/0169379 A1 | 7/2007 | Hazenberg et al. | |
| 2008/0066341 A1 | 3/2008 | Hottinger | |
| 2008/0148599 A1* | 6/2008 | Collins | B29D 35/142 |
| | | | 36/44 |
| 2008/0230956 A1 | 9/2008 | Allmendinger et al. | |
| 2009/0094855 A1 | 4/2009 | Finkelstein | |
| 2009/0313853 A1 | 12/2009 | Tadin | |
| 2010/0011618 A1 | 1/2010 | Bitton | |
| 2010/0047550 A1 | 2/2010 | Prissok et al. | |
| 2010/0154252 A1 | 6/2010 | Avent et al. | |
| 2010/0222442 A1 | 9/2010 | Prissok et al. | |

(56) References Cited

U.S. PATENT DOCUMENTS

| | | |
|---|---|---|
| 2010/0251565 A1 | 10/2010 | Litchfield et al. |
| 2011/0016747 A1 | 1/2011 | Bitton |
| 2011/0215497 A1 | 9/2011 | McEvoy et al. |
| 2011/0283560 A1* | 11/2011 | Portzline ............ A43B 13/186 36/31 |
| 2012/0036698 A1 | 2/2012 | Guertin |
| 2012/0073163 A1 | 3/2012 | Tse |
| 2012/0204451 A1 | 8/2012 | De Roode et al. |
| 2012/0210602 A1 | 8/2012 | Brown |
| 2013/0008050 A1 | 1/2013 | Marc |
| 2013/0145653 A1 | 6/2013 | Bradford |
| 2013/0247422 A1 | 9/2013 | Holt et al. |
| 2014/0007456 A1 | 1/2014 | Tadin |
| 2014/0151918 A1 | 6/2014 | Hartmann |
| 2014/0223776 A1 | 8/2014 | Wardlaw et al. |
| 2014/0223777 A1 | 8/2014 | Whiteman et al. |
| 2014/0283413 A1 | 9/2014 | Christensen et al. |
| 2015/0196085 A1 | 7/2015 | Westmoreland et al. |
| 2015/0223564 A1 | 8/2015 | Peyton et al. |
| 2015/0257481 A1 | 9/2015 | Campos, II et al. |
| 2016/0073732 A1 | 3/2016 | Ernst et al. |
| 2016/0278481 A1 | 9/2016 | Le et al. |
| 2017/0055636 A1 | 3/2017 | Campos, II et al. |
| 2018/0132564 A1 | 5/2018 | Bruce et al. |
| 2019/0343225 A1 | 11/2019 | Reddy et al. |

FOREIGN PATENT DOCUMENTS

| | | |
|---|---|---|
| CN | 1211901 A | 3/1999 |
| CN | 2620493 Y | 6/2004 |
| CN | 1638663 A | 7/2005 |
| CN | 2888936 Y | 4/2007 |
| CN | 202051034 U | 11/2011 |
| CN | 202145956 U | 2/2012 |
| CN | 103141993 A | 6/2013 |
| CN | 103720129 A | 4/2014 |
| CN | 103747700 A | 4/2014 |
| CN | 104010541 A | 8/2014 |
| CN | 104203029 A | 12/2014 |
| CN | 104363783 A | 2/2015 |
| CN | 104490008 A | 4/2015 |
| CN | 109952042 A | 6/2019 |
| DE | 2907506 A1 | 9/1980 |
| DE | 3406504 A1 | 8/1985 |
| DE | 3627538 A1 | 2/1988 |
| DE | 3723549 A1 | 2/1988 |
| DE | 3406504 C2 | 1/1990 |
| DE | 3839747 A1 | 5/1990 |
| DE | 3905989 C2 | 1/1991 |
| DE | 4202159 A1 | 7/1993 |
| DE | 4401282 A1 | 12/1994 |
| DE | 4446252 A1 | 6/1995 |
| DE | 19708622 A1 | 9/1997 |
| DE | 19938609 A1 | 3/2001 |
| DE | 10138426 C1 | 12/2002 |
| DE | 102009009589 A1 | 9/2010 |
| DE | 102010046278 A1 | 2/2011 |
| DE | 202016104626 U1 | 10/2016 |
| EP | 0007948 A1 | 2/1980 |
| EP | 130816 A2 | 1/1985 |
| EP | 316289 A2 | 5/1989 |
| EP | 0359699 A1 | 3/1990 |
| EP | 0383685 A1 | 8/1990 |
| EP | 529941 A1 | 3/1993 |
| EP | 2609824 A1 | 7/2013 |
| EP | 2649896 B1 | 10/2016 |
| EP | 3386334 A1 | 10/2018 |
| FR | 996111 A | 12/1951 |
| FR | 1018215 A | 12/1952 |
| FR | 2824884 A1 | 11/2002 |
| GB | 1301147 A | 12/1972 |
| GB | 2066049 A | 7/1981 |
| GB | 2462100 A | 1/2010 |
| JP | S56-080702 U | 6/1981 |
| JP | H02-121601 A | 5/1990 |
| JP | H02252401 A | 10/1990 |
| JP | H05-37104 U | 5/1993 |
| JP | H0723804 A | 1/1995 |
| JP | H0739404 A | 2/1995 |
| JP | 3042853 U | 11/1997 |
| JP | H11-32806 A | 2/1999 |
| JP | 2000316606 A | 11/2000 |
| JP | 2002306280 A | 10/2002 |
| JP | 2008533327 A | 8/2008 |
| JP | 2009056007 A | 3/2009 |
| JP | 2014033742 A | 2/2014 |
| JP | 2015513354 A | 5/2015 |
| JP | 2016182332 A | 10/2016 |
| KR | 19990069793 A | 9/1999 |
| KR | 100230096 B1 | 11/1999 |
| KR | 200374026 Y1 | 1/2005 |
| KR | 20100086227 A | 7/2010 |
| KR | 20120033710 A | 4/2012 |
| TW | 385636 U | 3/2000 |
| WO | WO-1997035496 A1 | 10/1997 |
| WO | WO-9947014 A1 | 9/1999 |
| WO | WO-2006049401 A1 | 5/2006 |
| WO | WO-2008012809 A2 | 1/2008 |
| WO | WO-2012177957 A2 | 12/2012 |
| WO | WO-2013013784 A1 | 1/2013 |
| WO | WO-2014126799 A1 | 8/2014 |
| WO | WO-2015/065578 A1 | 5/2015 |
| WO | WO-2018169535 A1 | 9/2018 |
| WO | WO-2018175734 A1 | 9/2018 |
| WO | WO-2020125963 A1 | 6/2020 |

OTHER PUBLICATIONS

European Patent Office as The International Searching Authority, International Search Report and Written Opinion for PCT Application No. PCT/US2016/053240, dated Jan. 3, 2017.

European Patent Office as The International Searching Authority, International Search Report and Written Opinion for PCT Application No. PCT/US2016/053260, dated Dec. 15, 2016.

European Patent Office as The International Searching Authority, International Search Report and Written Opinion for PCT Application No. PCT/US2016/053232, dated Jan. 10, 2017.

European Patent Office as The International Searching Authority, International Search Report and Written Opinion for PCT Application No. PCT/US2016/053246, dated Jan. 10, 2017.

European Patent Office as The International Searching Authority, International Search Report and Written Opinion for PCT Application No. PCT/US2016/053265, dated Dec. 20, 2016.

United States Patent and Trademark Office, Office Action for U.S. Appl. No. 15/816,270, dated Apr. 17, 2018.

United States Patent and Trademark Office, Office Action for U.S. Appl. No. 15/816,200, dated Apr. 18, 2018.

European Patent Office (ISA), International Preliminary Report on Patentability for International Application No. PCT/US2017/022651, dated Sep. 26, 2019.

European Patent Office (ISA), International Preliminary Report on Patentability for International Application No. PCT/US2017/022647, dated Sep. 26, 2019.

United States Patent and Trademark Office, Office Action for U.S. Appl. No. 15/574,700, dated Oct. 22, 2019.

European Patent Office, Communication pursuant to Article 94(3) EPC for EP Application No. 16777863.8, dated Apr. 15, 2020.

Japan Patent Office, Decision of Rejection for JP Application No. 2018-515812, dated Apr. 6, 2020.

European Patent Office, Extended European Search Report for EP Application No. 19212921.1, dated Mar. 31, 2020.

Korean Intellectual Property Office, Office Action for Application No. 10-2018-7011477, dated May 29, 2019.

Korean Intellectual Property Office, Office Action for Application No. 10-2018-7011479, dated Jun. 4, 2019.

Korean Intellectual Property Office, Office Action for Application No. 10-2018-7011480, dated Jun. 10, 2019.

Korean Intellectual Property Office, Office Action for Application No. 10-2018-7011478, dated Jun. 4, 2019.

(56) References Cited

OTHER PUBLICATIONS

European Patent Office, Extended European Search Report for EP Application No. 19196682.9, dated Jan. 2, 2020.
China National Intellectual Property Office, Office Action for CN Application No. 201680062271.7, dated Feb. 3, 2020.
European Patent Office, Communication pursuant to Article 94(3) EPC for EP Application No. 16777865.3, dated Apr. 20, 2020.
Korean Intellectual Property Office, Office Action for KR Application No. 10-2020-7003423, dated Apr. 21, 2020.
Japan Patent Office, Notice of Reasons for Rejection for JP Application No. 2018-515812 dated Jul. 29, 2019.
Japan Patent Office, Notice of Reasons for Rejection for JP Application No. 2018-515822 dated Jul. 22, 2019.
Japan Patent Office, Notice of Reasons for Rejection for JP Application No. 2018-515842 dated Aug. 5, 2019.
Japan Patent Office, Notice of Reasons for Rejection for JP Application No. 2018-515825 dated Jul. 22, 2019.
Japan Patent Office, Notice of Reasons for Rejection for JP Application No. 2018-515843 dated Aug. 5, 2019.
Japan Patent Office, Notice of Reasons for Rejection for JP Application No. 2018-515828 dated Jul. 22, 2019.
Taiwan Intellectual Property Office, Search Report for TW Application No. 105130844 dated Aug. 27, 2019.
European Patent Office (ISA), International Search Report and Written Opinion for PCT Application No. PCT/US2017/022651, dated Oct. 25, 2017.
European Patent Office (ISA), International Search Report and Written Opinion for PCT Application No. PCT/US2017/022647, dated Nov. 2, 2017.
Korean Intellectual Property Office, Office Action for Application No. 10-2018-7011476, dated May 29, 2019.
Korean Intellectual Property Office, Office Action for KR Application No. 10-2018-7011479, dated Dec. 26, 2019.
Korean Intellectual Property Office, Office Action for KR Application No. 10-2018-7011480, dated Jan. 21, 2020.
Korean Intellectual Property Office, Office Action for KR Application No. 10-2019-7036063, dated Feb. 7, 2020.
China National Intellectual Property Office, Office Action for CN Application No. 201680066156.7, dated Jan. 22, 2020.
China National Intellectual Property Office, Office Action and Search Report for CN Application No. 201680062323.0, dated Mar. 4, 2020.
China National Intellectual Property Office, Office Action and Search Report for CN Application No. 201680062231.2, dated Mar. 24, 2020.
China National Intellectual Property Office, Office Action for CN Application No. 201680066534.1, dated Mar. 26, 2020.
China National Intellectual Property Office, Office Action and Search Report for CN Application No. 201680062300.X, dated Mar. 12, 2020.
European Patent Office, Communication pursuant to Article 94(3) EPC for EP Application No. 16777864.6, dated Apr. 7, 2020.
European Patent Office (ISA), International Search Report and Written Opinion for PCT Application No. PCT/US2020/042784, dated Sep. 17, 2020.
GE, Chengbiao et al., Steam-chest molding of expanded thermoplastic polyurethane bead foams and their mechanical properties, Chemical Engineering Science 174 (2017) pp. 337-346.
Japan Patent Office, Notification of Reasons for Refusal for JP Application No. 2019-550843, dated Nov. 24, 2020.
European Patent Office, Communication pursuant to Article 94(3) EPC for EP Application No. 16777864.6, dated Dec. 16, 2020.
European Patent Office, Communication pursuant to Article 94(3) EPC for EP Application No. 16777863.8, dated Dec. 22, 2020.
KS65 Luxury Light Fescue—Field Green <http://www.kodiaksports.com/Artificial-Turf/Fake-Grass/Artificial-Grass-ST65_LFS_Field, Oct. 12, 13, (Oct. 12, 2013), Retrieved from internet: URL:https://web.archive.org/web/*/http://www.kodiaksports.com/core/media/media.nl/id.28351/c.1 268496/.f?h=1c04c87e9fd3f9d67f24 [retrieved on Dec. 15, 2016].
European Patent Office as the International Searching Authority, International Search Report and Written Opinion for PCT Application No. PCT/US2020/042735, dated Sep. 16, 2020.
European Patent Office as the International Searching Authority, International Search Report and Written Opinion for PCT Application No. PCT/US2020/042784, dated Sep. 17, 2020.
European Patent Office as the International Searching Authority, International Search Report and Written Opinion for PCT Application No. PCT/US2020/042807, dated Sep. 16, 2020.
Taiwan Office Action for Application 109111247 dated Apr. 30, 2021.
Japan Patent Office, Notice of Reasons for Rejection for JP Application No. 2020-017002 dated May 31, 2021.
Japan Patent Office, Notice of Reasons for Rejection for JP Application No. 2019-550853 dated May 25, 2021.
Japanese Office Action for Application No. 2020-017000 dated May 31, 2021.
China National Intellectual Property Administration, Second Office Action for application No. 201780088457.4 dated Jul. 19, 2021.
Taiwan Intellectual Property Office, Office Action dated Sep. 3, 2021 for application No. 109125077.
Taiwan Intellectual Property Office, Office Action dated Jun. 3, 2021 for application No. 109125078.
Taiwan Intellectual Property Office, Office Action dated Jun. 3, 2021 for application No. 109125079.
China National Intellectual Property Administration, Decision of Rejection Office Action dated Jun. 29, 2021 for application No. 201680062323.0.

\* cited by examiner

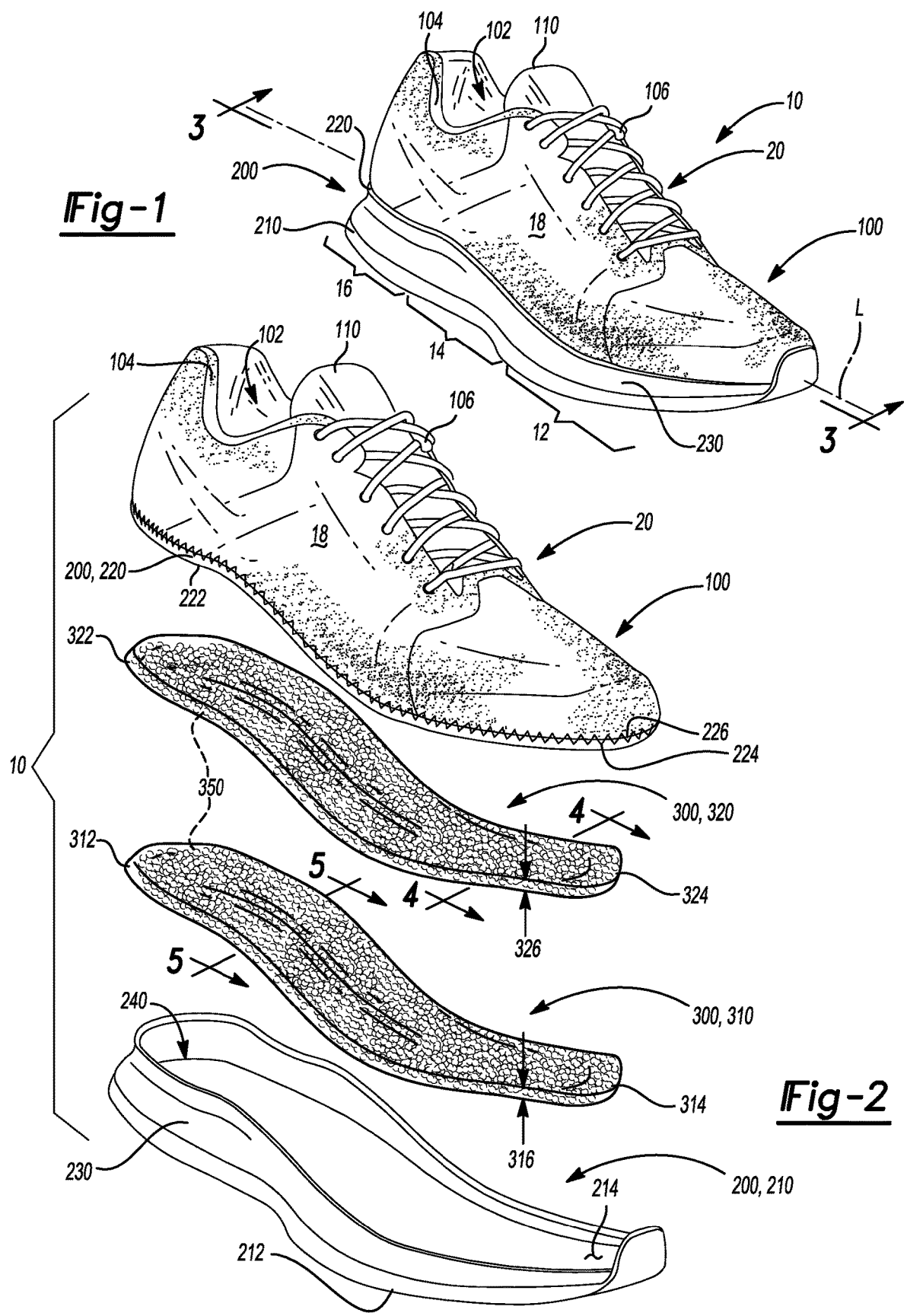

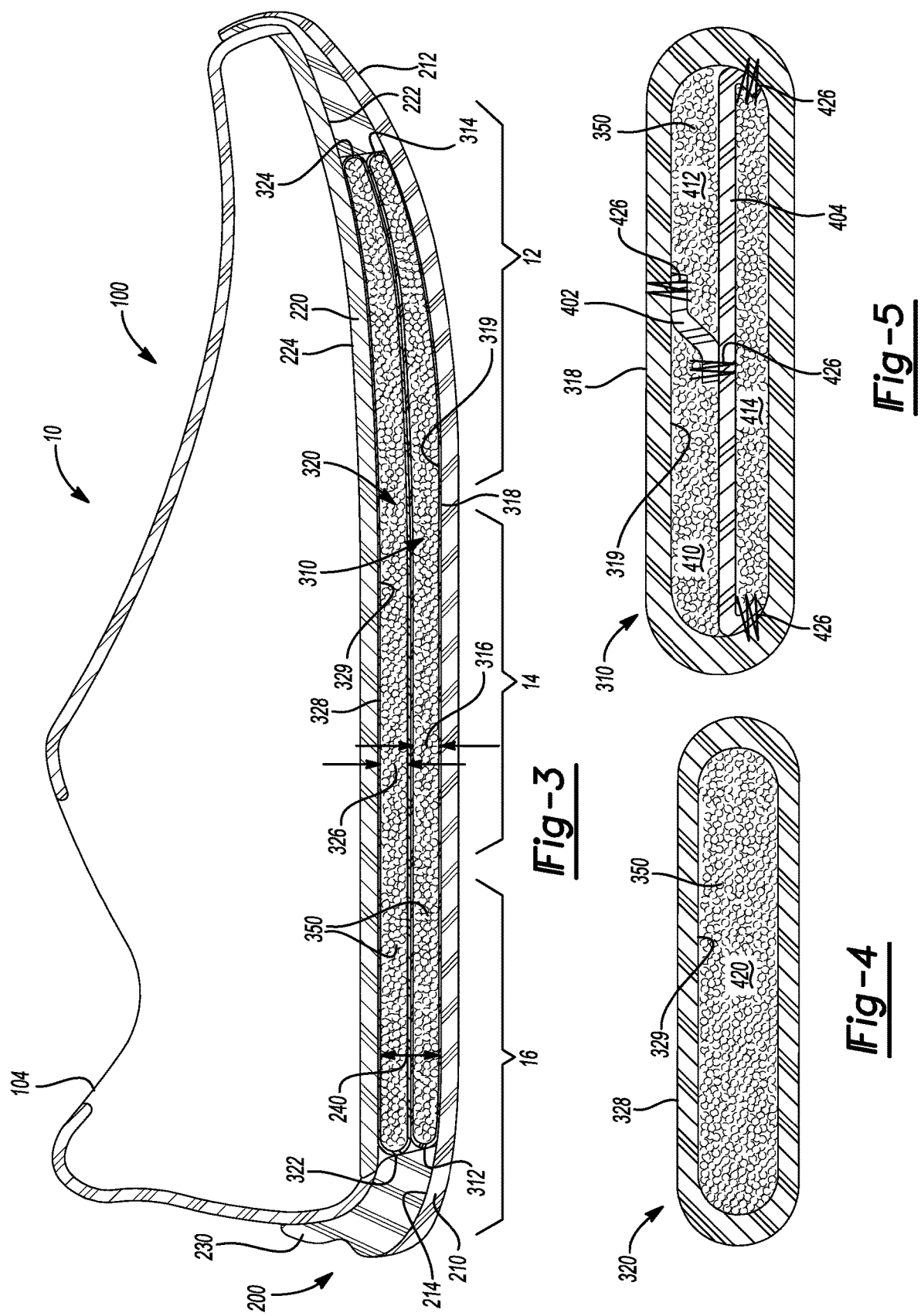

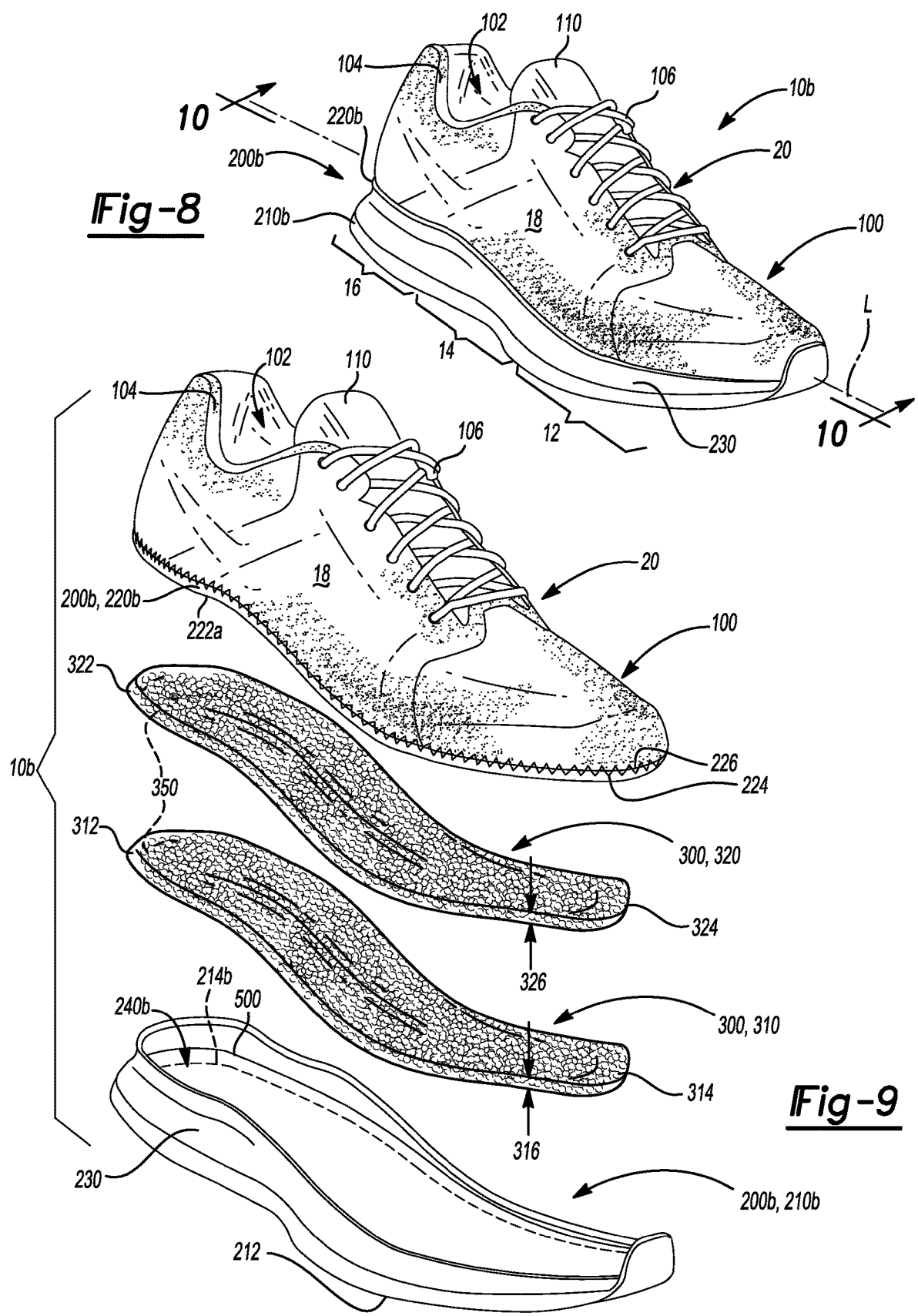

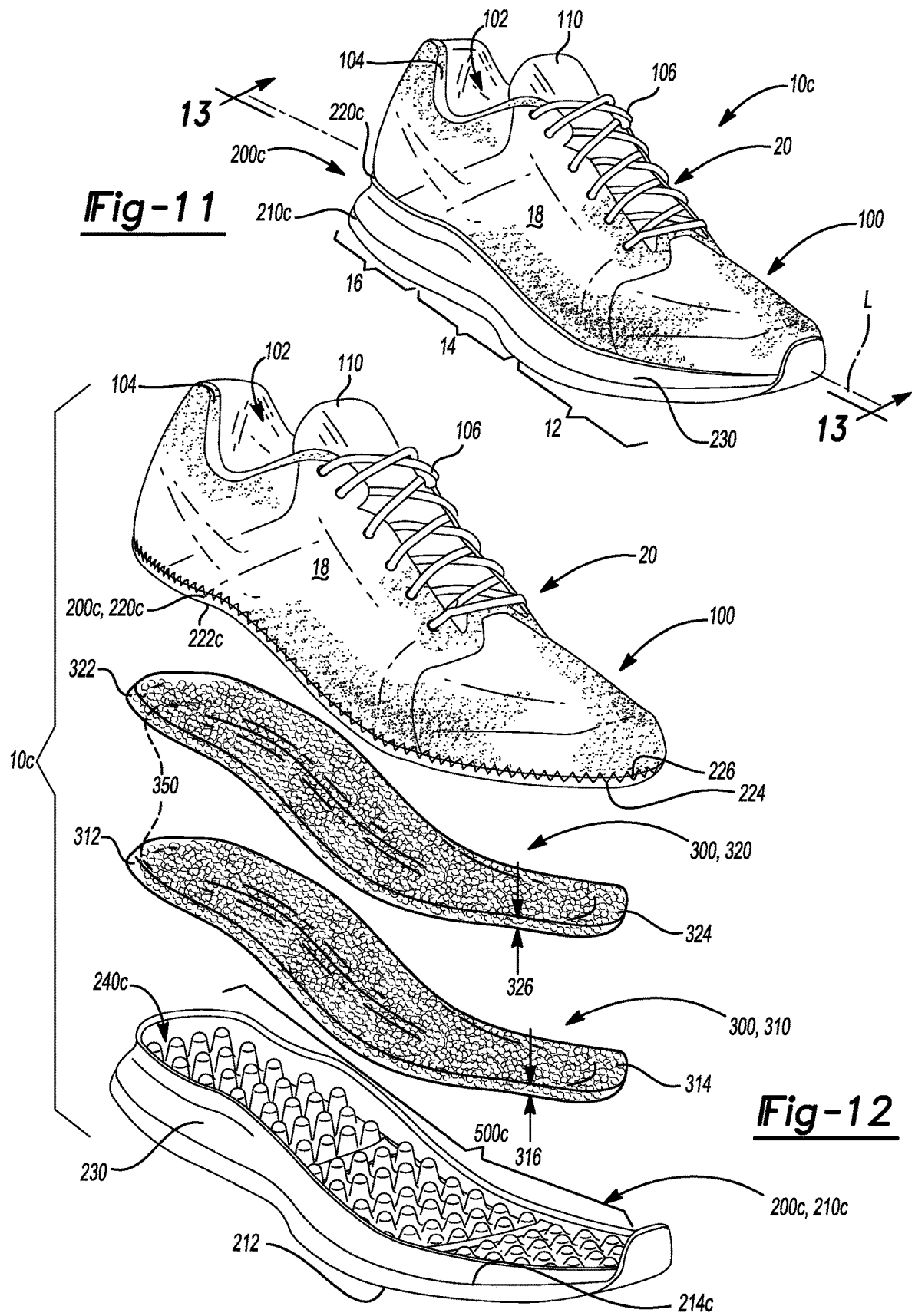

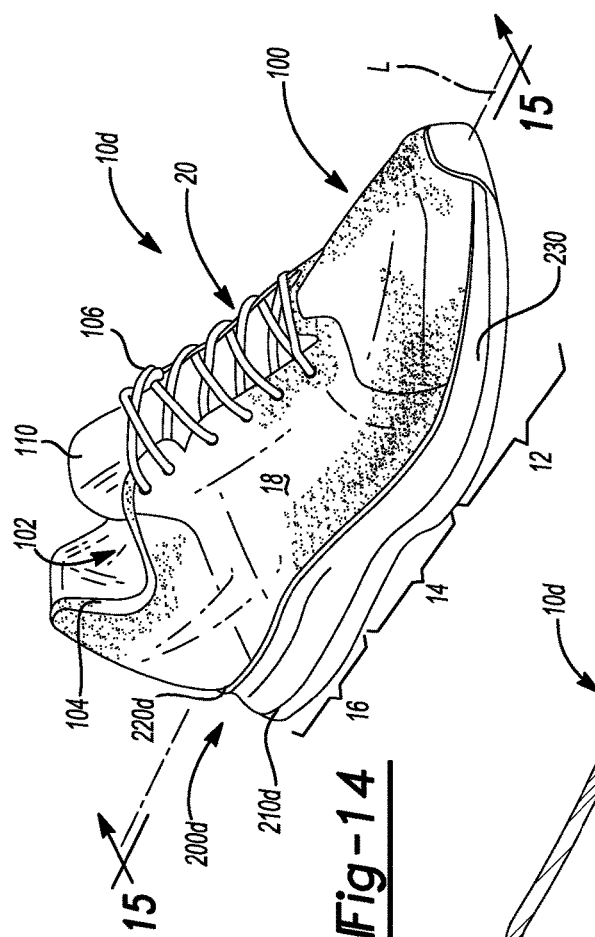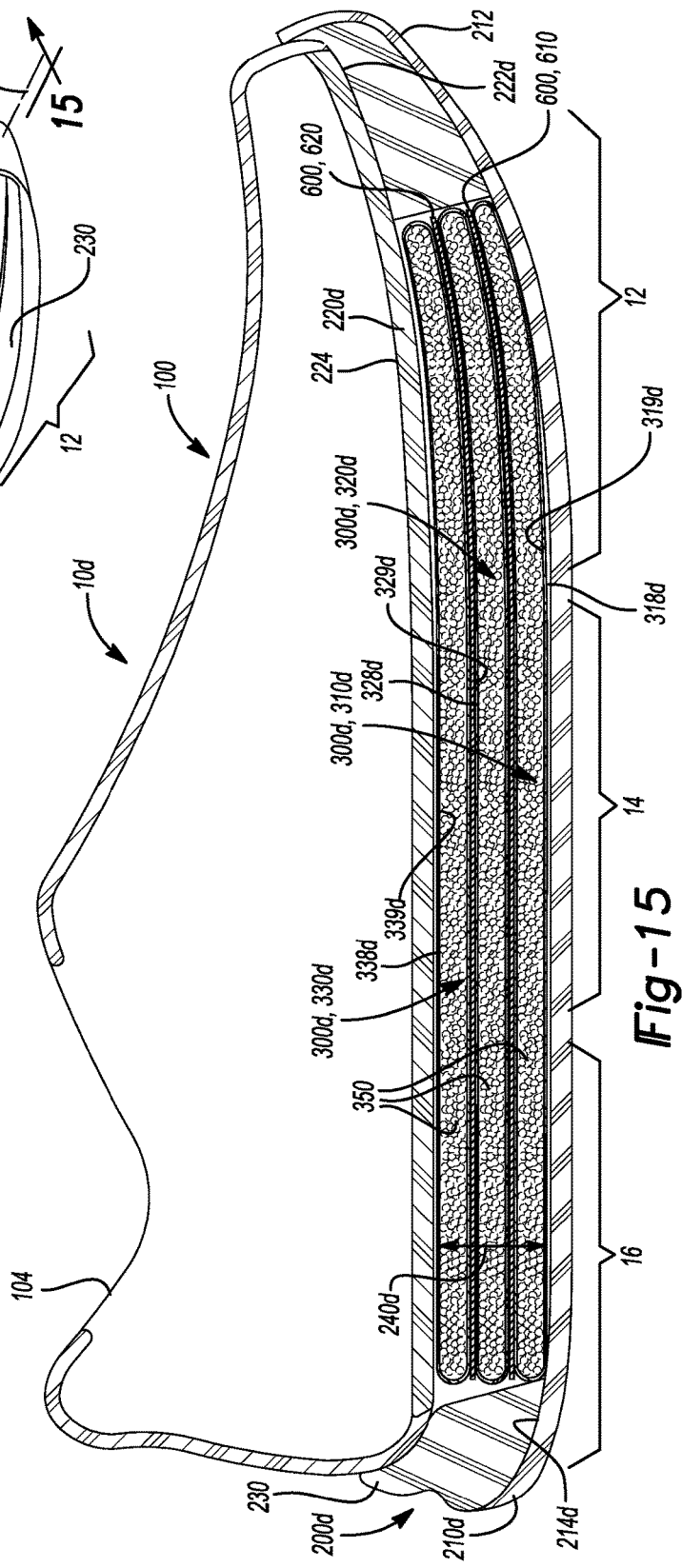

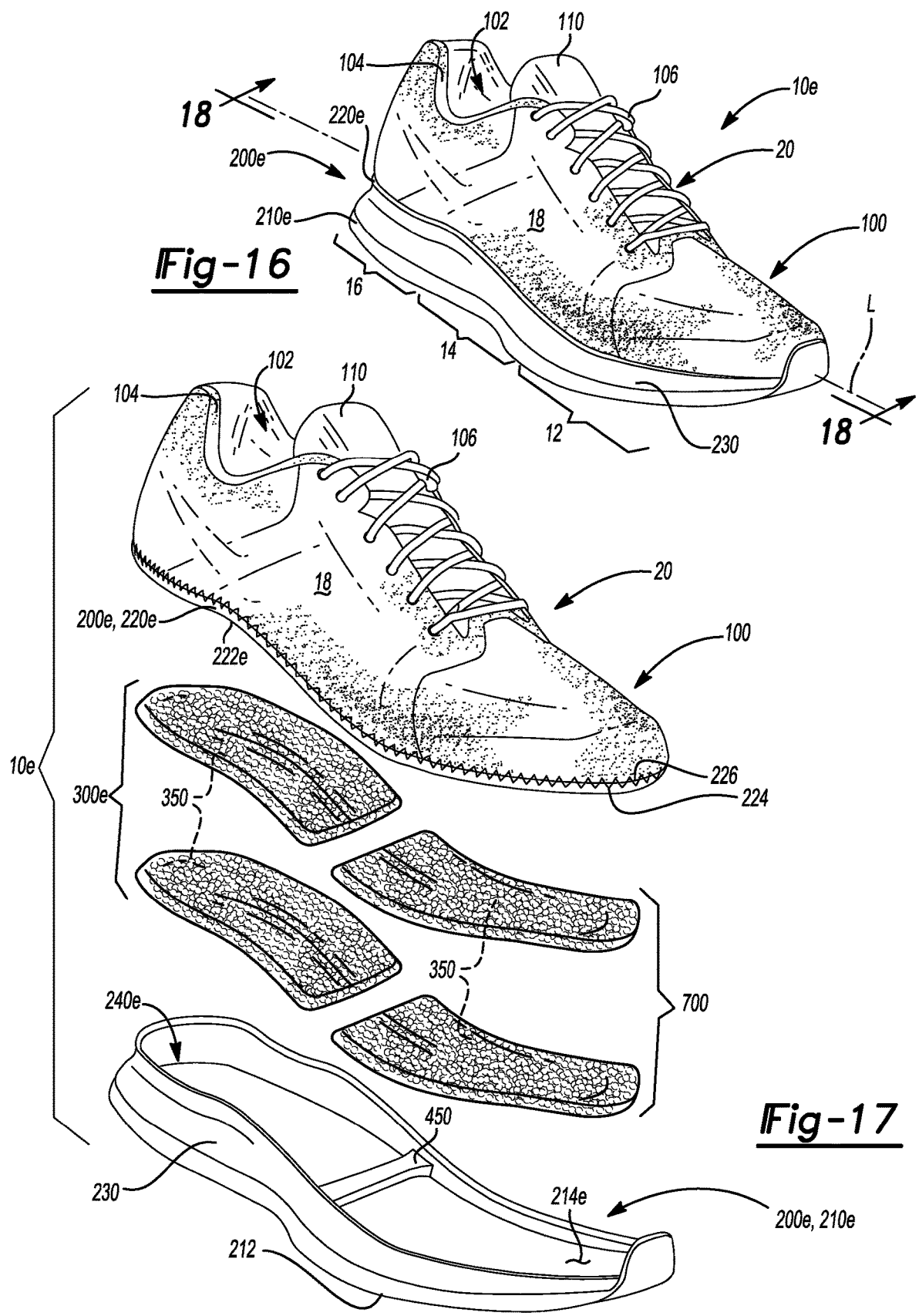

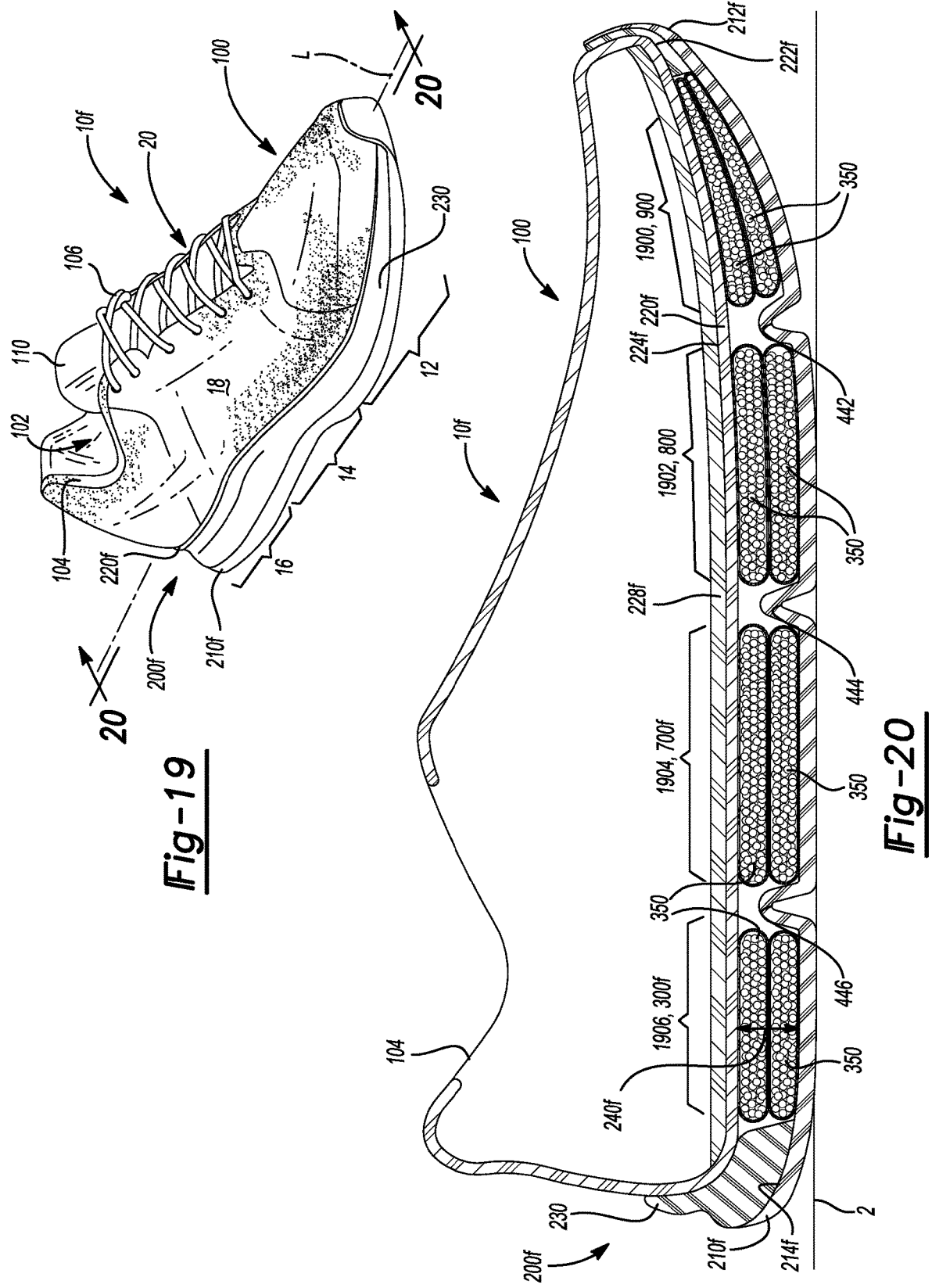

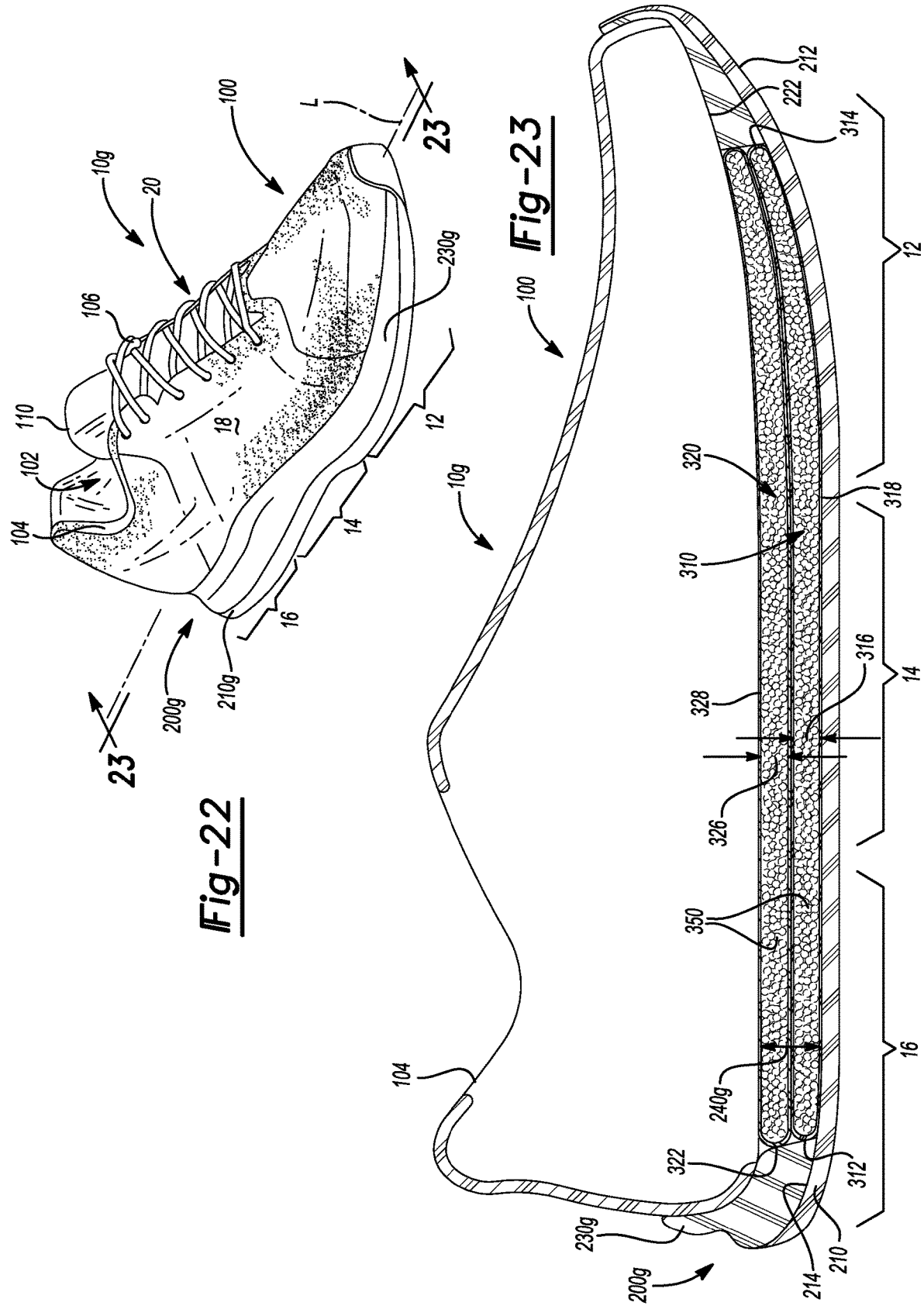

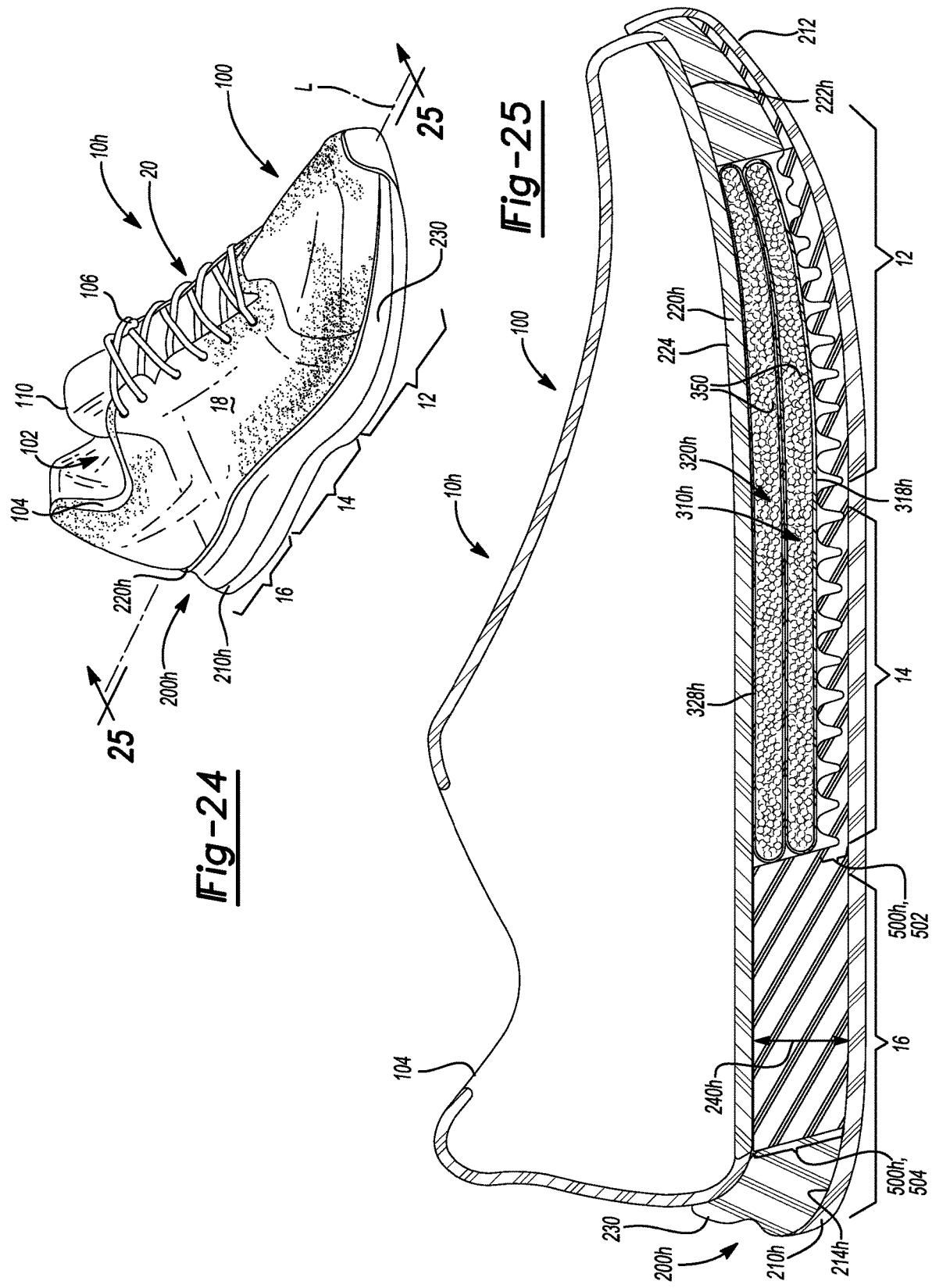

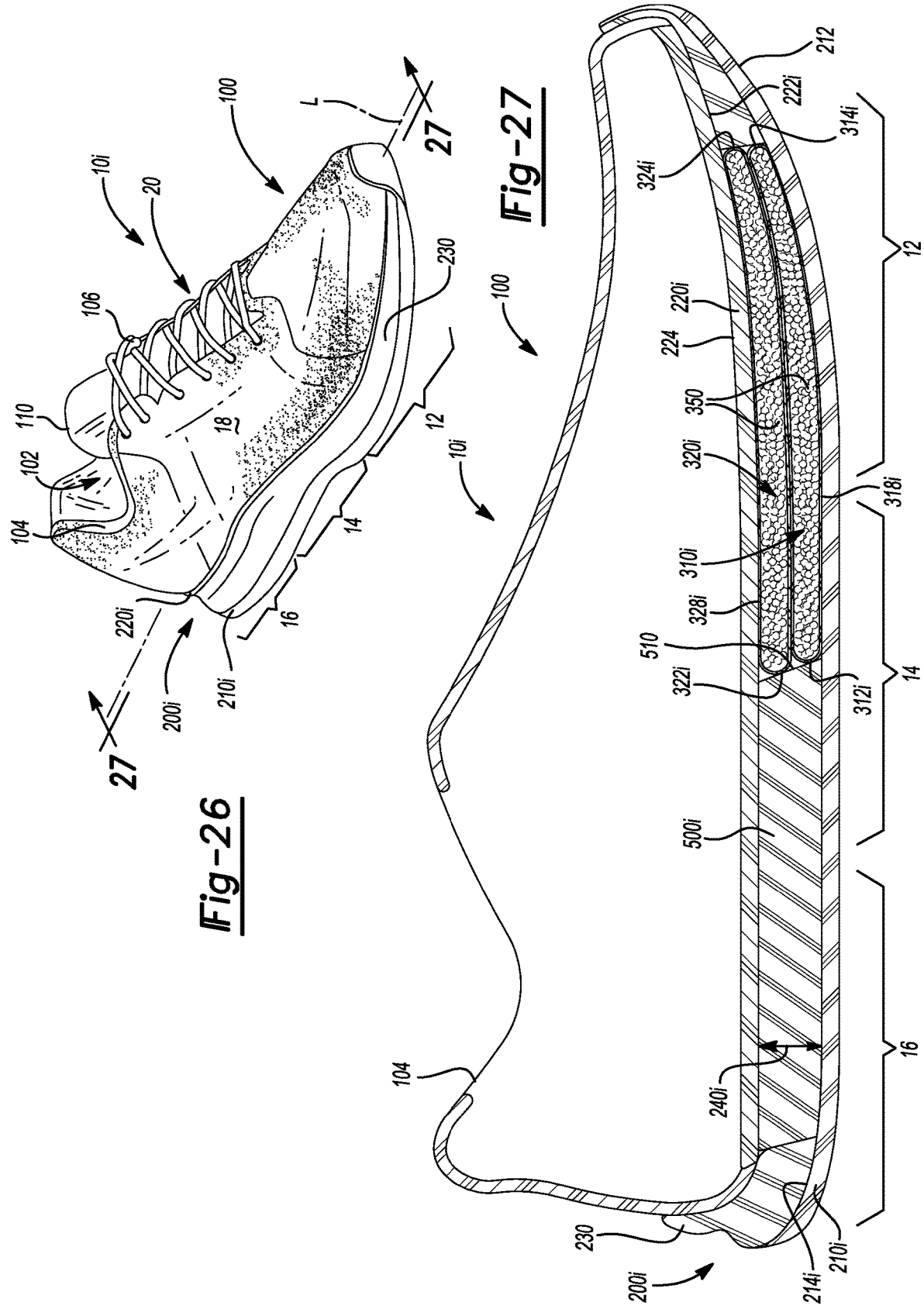

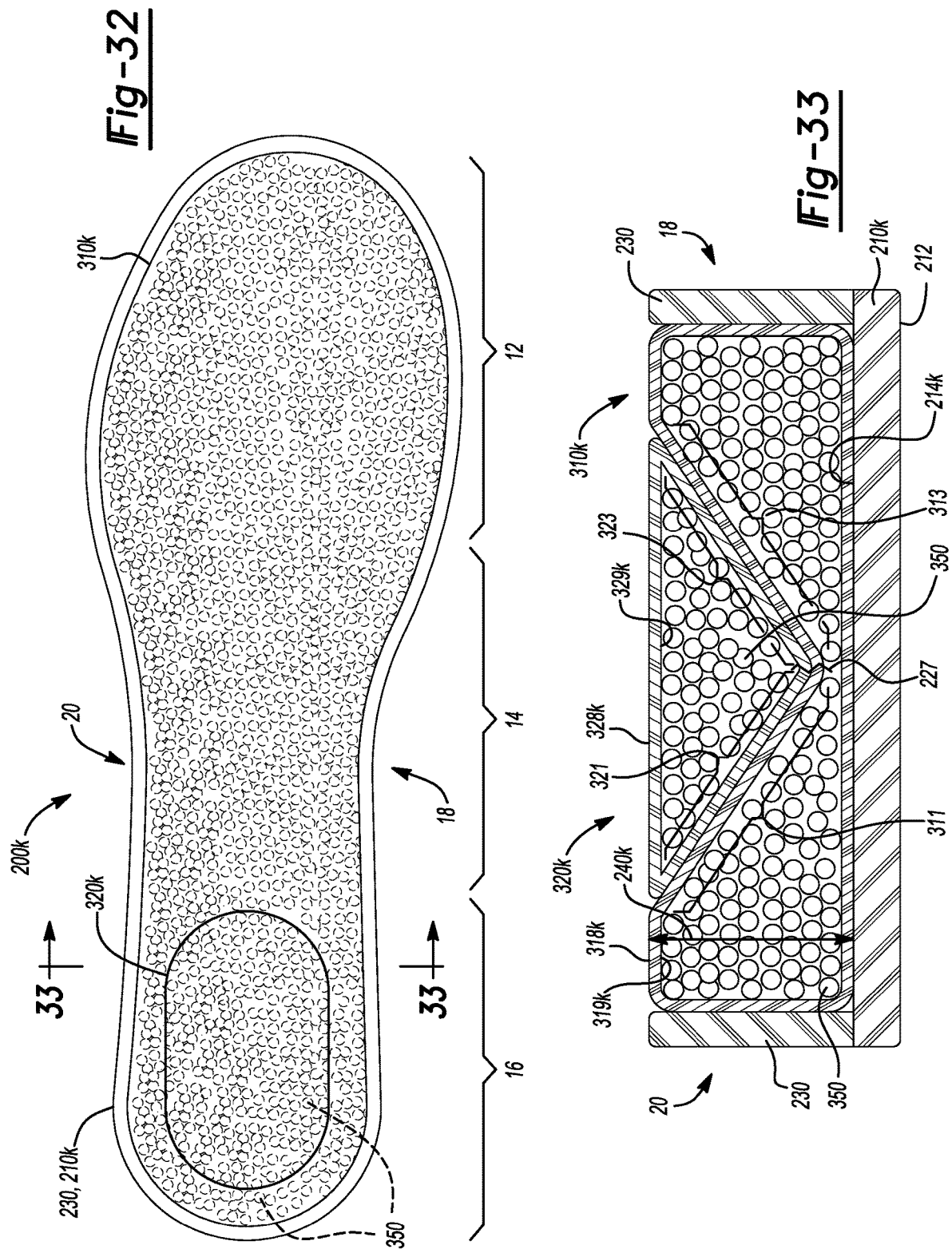

PARTICULATE FOAM STACKED CASINGS

CROSS REFERENCE TO RELATED APPLICATIONS

This application is a 371 National Stage entry based on International Application No. PCT/US2016/053240, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

FIELD

The present disclosure relates generally to articles of footwear having particulate foam contained within flexible, stacked casings.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 1 is a top perspective view of an article of footwear in accordance with principles of the present disclosure;

FIG. 2 is an exploded view of the article of footwear of FIG. 1 showing a group of stacked casings each containing particulate matter and received within a cavity between an outsole and a midsole of a sole structure;

FIG. 3 is a cross-sectional view taken along line 3-3 of FIG. 1 showing a group of stacked casings each containing particulate matter and received within a cavity between an outsole and a midsole of a sole structure;

FIG. 4 is a cross-sectional view taken along line 4-4 of FIG. 2 showing particulate matter residing within an interior wall of a casing;

FIG. 5 is a cross-sectional view taken along line 5-5 of FIG. 2 showing particulate matter residing in internal segments of a casing;

FIG. 8 is a top perspective view of an article of footwear in accordance with principles of the present disclosure;

FIG. 9 is an exploded view of the article of footwear of FIG. 8 showing a sole structure including a bottom cushioning member disposed on an inner surface of an outsole and a group of stacked casings each containing particulate matter and disposed between the bottom cushioning member and a bottom surface of a midsole;

FIG. 11 is a top perspective view of an article of footwear in accordance with principles of the present disclosure;

FIG. 12 is an exploded view of the article of footwear of FIG. 11 showing a sole structure including a series of projections extending from an inner surface of an outsole and a group of stacked casings each containing particulate matter and disposed between the series of projections and a bottom surface of a midsole;

FIG. 14 is a top perspective view of an article of footwear in accordance with principles of the present disclosure;

FIG. 15 is a cross-sectional view taken along line 15-15 of FIG. 14 showing intermediate cushioning members disposed between each layer of a group of stacked casings each containing particulate matter and received within a cavity between an outsole and a midsole of a sole structure;

FIG. 16 is a top perspective view of an article of footwear in accordance with principles of the present disclosure;

FIG. 17 is an exploded view of the article of footwear of FIG. 16 showing a first group of two stacked casings and a second group of two stacked casings each containing particulate matter and received within a cavity between an outsole and a midsole of a sole structure;

FIG. 19 is a top perspective view of an article of footwear in accordance with principles of the present disclosure;

FIG. 20 is a cross-sectional view taken along line 20-20 of FIG. 19 showing four groups of stacked casings each containing particulate matter and received within a cavity between an outsole and a midsole of a sole structure when the sole structure is at rest;

FIG. 22 is a top perspective view of an article of footwear in accordance with principles of the present disclosure;

FIG. 23 is a cross-sectional view taken along line 23-23 of FIG. 22 showing two stacked casings each containing particulate matter and received on an outsole of a sole structure;

FIG. 24 is a top perspective view of an article of footwear in accordance with principles of the present disclosure;

FIG. 25 is a cross-sectional view taken along line 25-25 of FIG. 24 showing two stacked casings each containing particulate matter and a cushioning member received within a cavity between an outsole and a midsole of a sole structure;

FIG. 26 is a top perspective view of an article of footwear in accordance with the principles of the present disclosure;

FIG. 27 is a cross-sectional view taken along line 27-27 of FIG. 26 showing a cushioning member and two stacked casings each containing particulate matter and received within a cavity between an outsole and a midsole of a sole structure;

Figure 31:
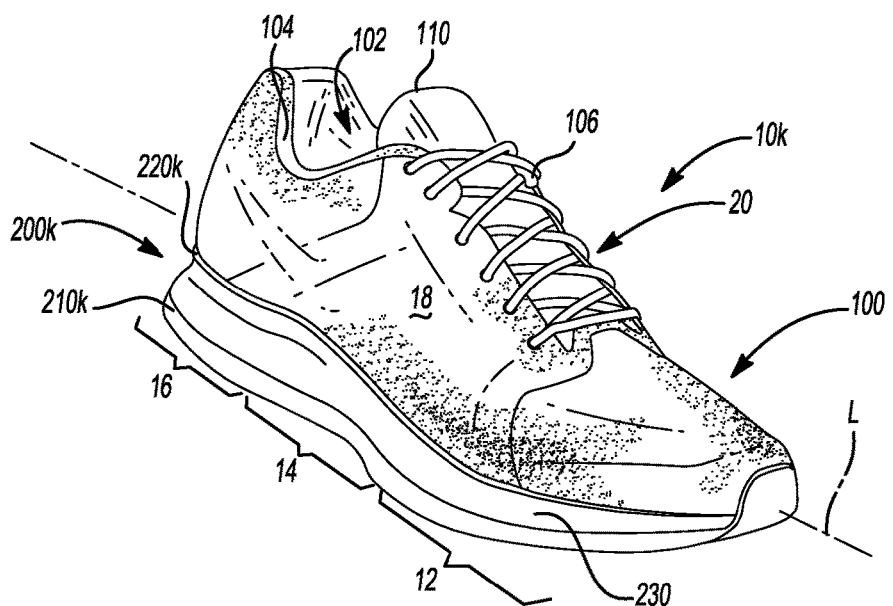
FIG. 31 is a top perspective view of an article of footwear in accordance with principles of the present disclosure.

FIG. 32 is a top view of a sole structure of the article of footwear of FIG. 31 showing a first casing containing particulate matter disposed on an inner surface of an outsole and a second casing containing particulate matter nested with the first casing at a heel portion of the sole structure; and FIG. 33 is a cross-sectional view taken along line 33-33 of FIG. 31 showing the second casing received within a void defined by the first casing.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure includes an article of footwear having an upper, a midsole, and an outsole. The midsole is attached to the upper and has a footbed and a bottom surface. The bottom surface and the footbed are disposed on opposite sides of the midsole. The outsole has a ground-engaging surface, an inner surface, and a wall extending from the ground-engaging surface and surrounding the outsole. The inner surface and the ground-engaging surface are disposed on opposite sides of the outsole. The article of footwear also includes a group of at least two casings each containing particulate matter. Each casing has a thickness extending substantially perpendicular to a longitudinal axis of the outsole. The at least two casings are arranged in a layered configuration and received within a cavity bounded by the wall of the outsole and between the bottom surface and the inner surface.

In some implementations, the at least two casings include approximately the same quantity of the particulate matter. In other implementations, the at least two casings include different quantities of the particulate matter. In some configurations, walls of at least one of the casings are secured together to define at least two segments that each contain a quantity of the particulate matter. The at least two segments may include approximately the same quantity of the particulate matter or may include different quantities of the particulate matter. In some examples, the thickness of the at least two casings is different. In other examples, the thickness of the at least two casings is approximately the same.

At least one of the two casings may be formed from a flexible material. Additionally or alternatively, at least one of the two casings may be formed from a mesh material. Optionally, at least one of the two casings is further formed from a nylon material.

The particulate matter may include foam beads having approximately the same size and shape or at least one of a different size and shape. The foam beads may include a substantially spherical shape. Additionally or alternatively, the foam beads include a substantially polygonal shape. In some implementations, a size and shape of the foam beads is approximately the same in each of the at least two casings. In other implementations, the size and shape of the foam beads is different in each of the at least two casings.

In some implementations, the article of footwear also includes a bottom cushioning member that resides within the cavity between the at least two casings and the inner surface of the outsole. The bottom cushioning member may include a polymer slab of foam, a fluid-filled bladder, or a series of projections that extend from the inner surface in a direction toward the bottom surface. The series of projections may be spaced apart from the bottom surface. The article of footwear may also include an intermediate cushioning member disposed between each of the at least two casings.

In some configurations, the at least two casings have a length that is substantially equal to a length of the outsole. In other configurations, the at least two casings having a length that is less than a length of the outsole. In these configurations, the article of footwear may include a second group of at least two casings that each contain particulate matter. The second group of the at least two casings may be arranged in a layered configuration and received within the cavity. The group of the at least two casings may be disposed proximate to a heel portion of the outsole and the second group of the at least two casings may be disposed proximate to a forefoot portion of the outsole.

Another aspect of the disclosure includes an article of footwear having an upper, an outsole attached to the upper, and a midsole having a footbed and a bottom surface disposed on an opposite side of the midsole than the footbed. The outsole has a ground-engaging surface and an inner surface disposed on an opposite side of the outsole than the ground-engaging surface. A wall extends from the ground-engaging surface and surrounds the outsole. The bottom surface of the midsole opposes the inner surface of the outsole to define a cavity therebetween that is bounded by the wall. The article of footwear also includes a first casing and a second casing each containing particulate matter and received within the cavity. The first casing opposes the inner surface of the outsole and the second casing is disposed between the first casing and the bottom surface of the midsole.

In some configurations, walls of at least one of the first casing and the second casing are secured together to define at least two segments that each contain approximately the same quantity of the particulate matter. In other configurations, walls of at least one of the first casing and the second casing are secured together to define at least two segments each containing different quantities of the particulate matter. The first casing and the second casing may be formed from a flexible material. Additionally or alternatively, the first casing and the second casing may be formed from a mesh material. Optionally, the first casing and the second casing are further formed from a nylon material.

The particulate matter may include foam beads having approximately the same size and shape or at least one of a different size and shape. The foam beads may include a substantially spherical shape. Additionally or alternatively, the foam beads include a substantially polygonal shape. In some implementations, a size and shape of the foam beads is approximately the same in the first casing and the second casing. In other implementations, at least one of a size and shape of the foam beads is different in the first casing and the second casing.

In some implementations, the article of footwear also includes a bottom cushioning member that resides within the cavity between the first casing and the inner surface of the outsole. The bottom cushioning member may include a polymer slab of foam, a fluid-filled bladder, or a series of projections that extend from the inner surface of the outsole and in a direction toward the bottom surface of the midsole. The series of projections may be spaced apart from the bottom surface. The article of footwear may also include an intermediate cushioning member disposed between the first casing and the second casing.

In some configurations, the first casing and the second casing have a length that is substantially equal to a length of the outsole. In other configurations, the article of footwear also includes a third casing and a fourth casing received within the cavity. In these configurations, the third casing opposes the inner surface of the outsole and the fourth casing opposes the third casing in a layered configuration and the first casing and the second casing each include a length that is shorter than a length of the outsole. Here, the third casing and the fourth casing may be disposed proximate to one of a forefoot portion and a mid-foot portion of the outsole, and the first casing and the second casing may be disposed proximate to a heel portion of the outsole. In some examples, the second casing has a different thickness extending in a direction substantially perpendicular to a longitudinal axis of the outsole than the first casing. The first casing and the second casing may include different quantities of the particulate matter.

In yet another aspect of the disclosure, an article of footwear having an upper, a midsole, and an outsole is provided. The outsole is attached to the upper and has a ground-engaging surface, an inner surface and a wall extending from the ground-engaging surface and surrounding the outsole. The inner surface is disposed on an opposite side of the outsole than the ground-engaging surface. The midsole has a footbed and a bottom surface. The bottom surface and the footbed are disposed on opposite sides of the midsole. The bottom surface opposes the inner surface of the outsole to define a cavity therebetween that is bounded by the wall of the outsole. The article of footwear also includes a first quantity of particulate matter received within the cavity and a second quantity of particulate matter received within the cavity, whereby the second quantity of particulate matter is separated from the first quantity of particulate matter. The second quantity of particulate matter is disposed between the first quantity of particulate matter and the bottom surface of the midsole.

In some implementations, the first quantity of particulate matter is received within a first casing. Additionally or alternatively, the second quantity of particulate matter is received within a second casing.

The first casing and the second casing may be formed from at least one of a flexible material, a mesh material, and a nylon material. The particulate matter may include foam beads having approximately the same size and shape or at least one of a different size and shape. The foam beads may include a substantially spherical shape. Additionally or alternatively, the foam beads include a substantially polygonal shape. In some implementations, a size and shape of the foam beads is approximately the same in the first casing and the second casing. In other implementations, at least one of a size and shape of the foam beads is different in the first casing and the second casing.

In some implementations, the article of footwear also includes a bottom cushioning member residing within the cavity between the first quantity of particulate matter and the inner surface of the outsole. In these implementations, the bottom cushioning member includes at least one of a slab of polymer foam, a fluid-filled bladder, and a series of projections extending from the inner surface in the direction toward the bottom surface. The series of projections may be spaced apart from the bottom surface of the midsole when the bottom cushioning member includes the series of projections. In some configurations, the first quantity of particulate matter and the second quantity of particulate matter are respectively received within flexible casings.

Another aspect of the disclosure provides a method of making an article of footwear. The method includes providing a cavity between a footbed and an outsole and providing a first casing containing particulate matter within the cavity and adjacent to the outsole. The method also includes providing a second casing containing particulate matter within the cavity and between the first casing and the footbed.

In some configurations, providing the first casing and the second casing within the cavity includes providing the first casing with a different thickness than the second casing, as measured in a direction extending substantially perpendicular to a longitudinal axis of the outsole. In other configurations, providing the first casing and the second casing within the cavity includes providing the first casing with substantially the same thickness as the second cavity, as measured in a direction extending substantially perpendicular to a longitudinal axis of the outsole.

In some implementations, the method also includes forming the first casing and the second casing from a flexible material. Additionally or alternatively, the method also includes forming the first casing and the second casing from a mesh material. Optionally, the method may include forming the first casing and the second casing from a nylon material.

In some examples, the method includes securing walls of the first casing and securing walls of the second casing together to define at least two segments within each of the first casing and the second casing. The at least two segments may be provided with approximately the same quantity of the particulate matter or may be provided with different quantities of the particulate matter. In some implementations, providing the first casing containing particulate matter and providing the second casing containing particulate matter includes providing the first casing and the second casing with a quantity of foam beads having at least one of a substantially spherical shape and a substantially polygonal shape. In some examples, providing the quantity of foam beads includes providing foam beads that include approximately the same size and shape. Alternatively, providing the quantity of foam beads may include providing foam beads that include at least one of a different size and shape.

In some implementations, the method also includes inserting a bottom cushioning member into the cavity between the first casing and the inner surface of the outsole. In one configuration, inserting the bottom cushioning member includes inserting at least one of a foam cushioning member and a fluid-filled cushioning member. Additionally or alternatively, the method may include inserting an intermediate cushioning member between the first casing and the second casing. Inserting the intermediate cushioning member between the first casing and the second casing may include inserting at least one of polymer foam and a fluid-filled bladder between the first casing and the second casing.

Referring to FIGS. 1-5, in some implementations, an article of footwear 10 includes an upper 100 and a sole structure 200 attached to the upper 100. The article of footwear 10 may be divided into one or more portions. The portions may include a forefoot portion 12, a mid-foot portion 14 and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 configured to receive and secure a foot for support on the sole structure 200. An ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot and accommodate entry and removal therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort.

In some implementations, the sole structure 200 includes an outsole 210 and a midsole 220 arranged in a layered configuration. The sole structure 200 (e.g., the outsole 210 and the midsole 220) defines a longitudinal axis L. For example, the outsole 210 engages with a ground surface during use of the article of footwear 10 and the midsole 220 is disposed between the upper 100 and the outsole 210. In some examples, the sole structure 200 may also incorporate additional layers such as an insole or sockliner that may reside within the interior void 102 of the upper 100 to receive a plantar surface of the foot to enhance the comfort of the footwear 10. In some examples, a sidewall 230 separates the outsole 210 and the midsole 220 to define a cavity 240 therebetween (FIG. 3).

In some implementations, a group of at least two stacked casings 300 each containing particulate matter 350 reside in the cavity 240 to provide cushioning for the foot during use of the footwear 10. Each casing 300 may have a thickness that extends substantially perpendicular to the longitudinal axis L of the sole structure 200 and has a length that extends substantially parallel to the longitudinal axis L of the sole structure 200. In some examples, the casings 300, when disposed within the cavity 240, are arranged in a stacked or layered configuration between the outsole 210 and the midsole 220. In some examples, at least one of the casings 300 is formed from a flexible material. At least one of the casings 300 may optionally be formed from a mesh material. Additionally or alternatively, at least one of the casings 300 may be formed from a nylon material. Providing casings 300 with sufficient flexibility allows the casings 300, and particulate matter 350 residing therein, to conform to the contours of the sole structure 200.

The group of at least two stacked casings 300 and the particulate matter 350 residing within the cavity 240 may cooperate to enhance the functionality and cushioning characteristics that a conventional midsole provides. For example, the particulate matter 350 contained within each casing 300 may include foam beads having a substantially spherical shape. Additionally or alternatively, the particulate matter 350 contained within each casing 300 may include foam beads having a substantially polygonal shape such as, but not limited to, rectangular or triangular shapes. In some examples, the particulate matter 350 includes foam beads that have approximately the same size and shape. In other examples, the particulate matter 350 includes foam beads having at least one of a different size and shape. Additionally, a size and shape of the foam beads may be approximately the same in each of the at least two casings 300, or at least one of a size and shape of the foam beads is different in each of the at least two casings 300. Regardless of the particular size and shape of the particulate matter 350 disposed within the at least two casings 300, the particulate matter 350 cooperates with the outsole 210 and the midsole 220 to provide the article of footwear 10 with a cushioned and responsive performance.

In some examples, the outsole 210 includes a ground-engaging surface 212 and an opposite inner surface 214. The outsole 210 may attach to the upper 100. In some examples, the sidewall 230 extends from the perimeter of the outsole 210 and attaches to the midsole 220 and/or the upper 100. The example of FIG. 1 shows the outsole 210 attaching to the upper 100 proximate to a tip of the forefoot portion 12. The outsole 210 generally provides abrasion-resistance and traction with the ground surface and may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. In some examples, an insole or sockliner (neither shown) may be disposed on the footbed 224 under the foot within at least a portion of the interior void 102 of the upper 100. The bottom surface 222 may oppose the inner surface 214 of the outsole 210 to define the cavity 240 therebetween. The midsole 220 may be formed from a flexible material to allow a user's foot to conform to and move with the particulate matter 350 residing in the cavity 240. As such, the flexible midsole 220 may form a flexible strobe that allows the particulate matter 350 residing in the cavity 240 to interact with the profile of the bottom surface of the foot during gradient loading of the sole structure 200.

In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under an applied load to attenuate ground-reaction forces. In some examples, the sidewall 230 is integrally formed with the outsole 210 and extends substantially perpendicular to the longitudinal axis L from the inner surface 214 toward the bottom surface 222 of the midsole 220.

FIG. 2 provides an exploded view of the article of footwear 10 showing two casings 300 each containing the particulate matter 350 and received within the cavity 240 between the outsole 210 and the midsole 220. The group of two casings 300 includes a first casing 310 opposing the inner surface 214 of the outsole 210 and a second casing 320 that opposes and stacks on the first casing 310. The first casing 310 defines a length extending substantially parallel to the longitudinal axis L of the sole structure 200 between a first end 312 and a second end 314, a thickness 316 extending substantially perpendicular to the longitudinal axis L of the sole structure 200, and a width extending between the lateral and medial sides 18, 20, respectively. Similarly, the second casing 320 defines a length extending substantially parallel to the longitudinal axis L of the sole structure 200 between a first end 322 and a second end 324, a thickness 326 extending substantially perpendicular to the longitudinal axis L of the sole structure 200, and a width extending between the lateral and medial sides 18, 20, respectively. The first ends 312, 322 may be disposed proximate to the heel portion 16 of the outsole 210 and the second ends 314, 324 may be disposed proximate to the forefoot portion 12 of the outsole 210. Accordingly, the group of two stacked casings 300 may extend through the forefoot, mid-foot, and heel portions 12, 14, 16, respectively, of the outsole 210.

The length and thickness of each casing 310, 320 cooperate to define a volume for receiving the particulate matter 350 therein. In some examples, the thickness 316, 326 of the first and second casings 310, 320, respectively, is approximately the same. In these examples, if the first and second casings 310, 320, respectively, each define approximately the same length, the quantity of particulate matter 350 residing therein may be approximately the same. One of the casings 310, 320, however, may include a greater quantity of particulate matter 350 than the other casing 310, 320 even if the thicknesses and the lengths of the casings 310, 320 are approximately the same. In so doing, the density of particulate matter 350 can vary between the first and second casings 310, 320, respectively, thereby resulting in different levels of soft-type cushioning provided by the particulate matter 350 residing in each of the casings 310, 320. In other examples, the thickness 316, 326 of the first and second casings 310, 320, respectively, is different. In these examples, the quantities of particulate matter 350 residing therein may be different or alternatively, may be the same.

Referring to FIG. 3, a cross-sectional view taken along line 3-3 of FIG. 1 shows the stacked, first and second casings 310, 320, respectively, each containing the particulate matter 350 and received within the cavity 240 between the outsole 210 and the midsole 220. FIG. 3 shows the casings 310, 320 stacked in a layered configuration such that an exterior wall 318 of the first casing 310 is in contact with both the inner surface 214 of the outsole 210 and an exterior wall 328 of the second casing 320. The exterior wall 328 of the second casing 320 may also contact the bottom surface 222 of the midsole 220 on a side opposite the first casing 310 such that the second casing 320 is disposed between the first casing 310 and the midsole 220. In some configurations, the midsole 220, or a portion thereof, may be removed to provide direct contact between the bottom surface of the foot and the exterior wall 328 of the second casing 320. The first and second casings 310, 320, respectively, may each define a corresponding interior surface 319, 329, respectively, that surrounds and encloses the particulate matter 350 residing therein. The quantity of the particulate matter 350 residing within each of the casings 310, 320 may be the same or different. For example, by varying at least one of the thickness and the density of the particulate matter 350 within the casings 310, 320, the quantity of particulate matter 350 residing therein can be increased or decreased.

The particulate matter 350 residing within each of the first and second casings 310, 320, respectively, may compress at one or more portions 12, 14, 16 of the sole structure 200 to attenuate ground-reaction forces when gradient loads are applied thereto. In some examples, the first casing 310 includes a larger thickness 316 than the thickness 326 of the second casing 310 to provide a greater quantity of particulate matter 350 residing in the first casing 310 situated at the bottom layer of the layered configurations. At least one of the casings 310, 320 may be formed from a flexible material to provide sufficient flexibility to conform to the shape and size of the cavity 240. For example, an interference fit may be provided between the first casing 310, the sidewall 230, and the inner surface 214 when the first casing 310 is installed within the cavity 240. Likewise, an interference fit may be provided between the second casing 320, the sidewall 230, the first casing 310, and the bottom surface 222 when the second casing 320 is installed within the cavity 240 and stacked on the first casing 310.

In some implementations, the particulate matter 350 (e.g., foam beads) slightly overfills at least one of the casings 310, 320 to permit the particulate matter 350 to occupy virtually all voids enclosed by the corresponding interior surface(s) 319, 329, thereby expanding each casing 310, 320 to provide a substantially uniform and smooth surface profile at the corresponding exterior wall(s) 318, 328. In contrast, when the casings 310, 320 are not overfilled with particulate matter 350, and are instead filled using the force of gravity alone, the casings 310, 320 may have voids unoccupied by particulate matter 350, thereby providing ample opportunity for the particulate matter 350 residing therein to shift and migrate freely when the sole structure 200 is compressed. FIG. 4 provides a cross-sectional view of the second casing 320 taken along line 4-4 of FIG. 2 showing an example of the particulate matter 350 substantially filling all voids enclosed by the internal surface 329. FIG. 5 provides a cross-sectional view of the first casing 310 taken along line 5-5 of FIG. 2 showing an example of the particulate matter 350 substantially filling all voids enclosed by the internal surface 319. Note that while the particulate matter 350 is described as substantially filling all voids of the casings 310, 320, gaps obviously exist between adjacent particulate matter 350, as the particulate matter 350 may include a substantially spherical shape.

Referring to FIG. 4, in some examples, the interior surface 329 of the second casing 320 defines a single internal region 420 that receives and contains the particulate matter 350 (e.g., foam beads). FIG. 4 shows the particulate matter 350 substantially filling all voids enclosed by the interior surface 329 within the single, internal region 420. Optionally, in other examples with reference to FIG. 5, the first casing 310 includes one or more dividers 402, 404 that cooperate with the interior surface 319 to define two or more internal regions 410, 412, 414 each receiving and containing a corresponding quantity of particulate matter 350 (e.g., foam beads). In these examples, the dividers 402, 404 restrict unfettered movement of the particulate matter 350 within the casing 310 during repeated compressions by constraining quantities of the particulate matter 350 within the corresponding internal regions 410, 412, 414, thereby maintaining a uniform distribution of the particulate matter 350 enclosed by the interior surface 319. In other examples, the first casing 310 defines a single internal region (as shown similarly in FIG. 4) while the second casing 320 may include one or more dividers to define two or more internal regions. Other configurations may include the first and second casings 310, 320, respectively, each defining two or more internal regions as shown in FIG. 5. In some implementations, the internal regions 410, 412, 414 include approximately the same quantity of the particulate matter 350. In other examples, at least one of the internal regions 410, 412, 414 includes a different quantity of the particulate matter 350.

The dividers 402, 404 may be secured to each other and to the interior and/or exterior walls 318, 328 respectively, by stitching 426 or other suitable fastening techniques. While the example of FIG. 5 shows the first casing 310 as including two dividers 402, 404 to define three internal regions 410, 412, 414, any configuration of one or more dividers may be used to define two or more internal regions. In some implementations, the first casing 310 (and/or the second casing 320) includes a combination of two or more internal regions 410, 412, 414 (FIG. 5) and a single internal region 420 (FIG. 4) along its length between the first and second ends 312 (322), 314 (324), respectively. For instance, segments of the casings 310, 320 susceptible to compressing more frequently during gradient loading of the sole structure 200, such as the heel portion 16 or the forefoot portion 12, may have two or more internal regions to restrict movement of the particulate matter 350 within and relative to the casings 310, 320. On the other hand, segments of the casings 310, 320 that compress less frequently, or are under low-compression, such as the mid-foot portion 14, may include a single internal region 420, as vast movement of the particulate matter 350 is less likely to occur. While the casings 310, 320 restrict free movement of the particulate matter 350, some shifting of particulate matter 350 residing within the casings 310, 320 may be desirable. For example, at segments proximate to the mid-foot portion 14, movement of the particulate matter 350 relative to and within the casings 310, 320 provides gradient cushioning as the ground-engaging surface 212 of the outsole 210 rolls for engagement with the ground surface between the heel portion 16 and the forefoot portion 12.

Figure 6:
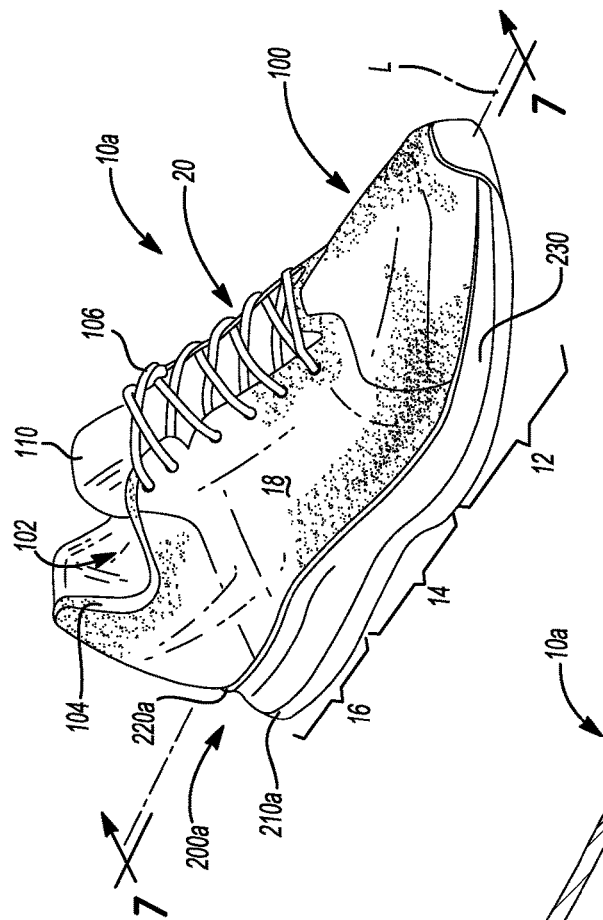
FIG. 6 is a top perspective view of an article of footwear in accordance with principles of the present disclosure.
Figure 7:
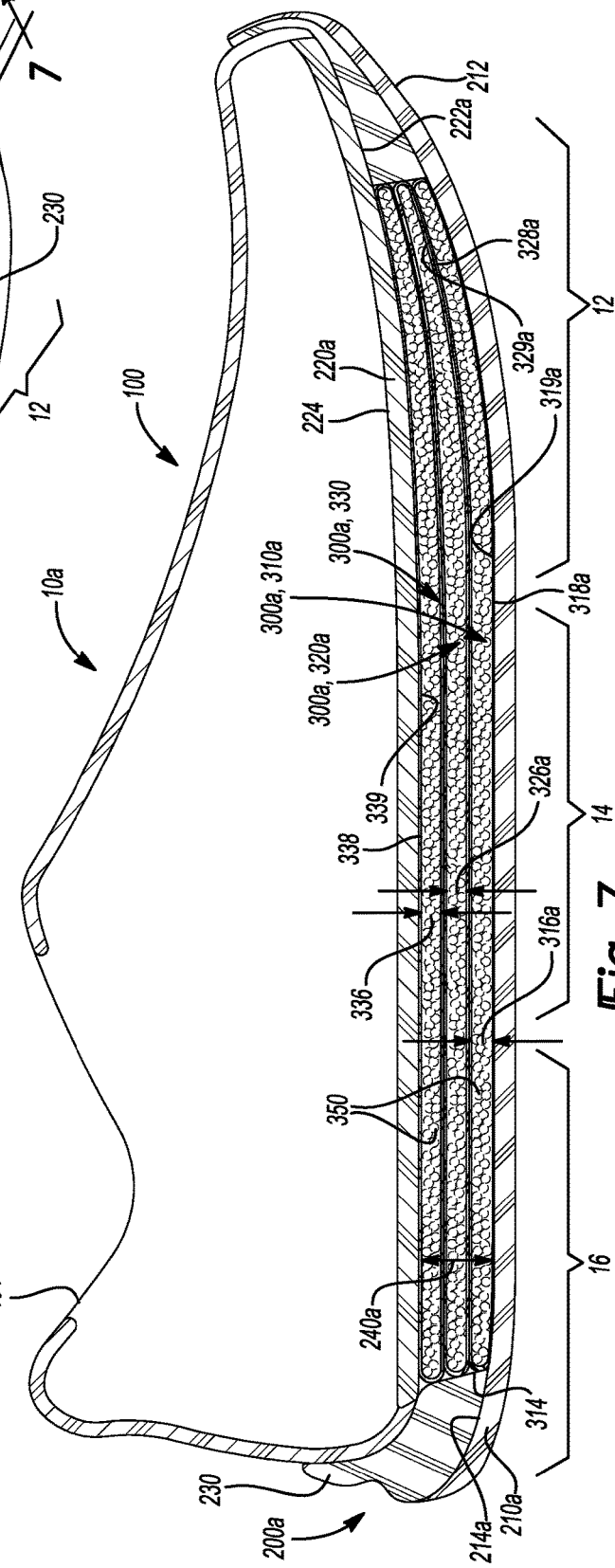
FIG. 7 is a cross-sectional view taken along line 7-7 of FIG. 6 showing a group of stacked casings each containing particulate matter and received within a cavity between an outsole and a midsole of a sole structure.

Referring to FIGS. 6 and 7, an article of footwear 10a is provided and includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified.

The sole structure 200a may include an outsole 210a and a midsole 220a arranged in the layered configuration. The outsole 210a includes an inner surface 214a disposed on an opposite side of the outsole 210a than the ground-engaging surface 212. The midsole 220a includes a bottom surface 222a disposed on an opposite side of the midsole 220a than the footbed 224 and may be formed from a flexible material. The sidewall 230 bounds a cavity 240a between the bottom surface 222a and the inner surface 214a. The sidewall 230 may separate the bottom surface 222a and the inner surface 214a to define a depth of the cavity 240a.

In some implementations, a group of at least three stacked casings 300a each containing particulate matter 350 reside in the cavity 240a to provide cushioning for the foot during use of the footwear 10a. FIG. 7 provides a cross-sectional view taken along line 7-7 of FIG. 6 showing a group of three stacked casings 300a each containing particulate matter 350 and received within the cavity 240a between the outsole 210a and the midsole 220a. The group of stacked casings 300a at least partially fills the cavity 240a and includes a first casing 310a opposing the inner surface 214a of the outsole 210a, a second casing 320a that opposes and is stacked on the first casing 310a, and a third casing 330 that opposes and is stacked on the second casing 320a. In this regard, the second casing 320a is disposed between the first casing 310a and the third casing 330, the first casing 310a is disposed between the second casing 320a and the outsole 210a, and the third casing 330 is disposed between the second casing 320a and the midsole 220a. In some configurations, the midsole 220a, or a portion thereof, may be removed to provide direct contact between the bottom surface of the foot and the third casing 330. The casings 310a, 320a, 330 each define a length extending substantially parallel to the longitudinal axis L of the sole structure 200a and a width extending between the lateral and medial sides 18, 20, respectively. Each of the casings 310a, 320a, 330 may also define a corresponding thickness 316a, 326a, 336, respectively, extending substantially perpendicular to the longitudinal axis L of the sole structure 200a. In some examples, the thicknesses of the first, second, and third casings 310a, 320a, 330, respectively, are approximately the same. In other examples, the thickness of at least one of the first, second, and third casings 310d, 320d, 330, respectively, is different.

The particulate matter 350 residing within each of the first, second, and third casings 310a, 320a, 330, respectively, may compress at one or more portions 12, 14, 16 of the sole structure 200a to attenuate ground-reaction forces when gradient loads are applied thereto. In some examples, the first casing 310a includes a larger thickness 316a than the thickness 326a of the second casing 320a and the thickness 336 of the third casing 330 to provide a greater quantity of particulate matter 350 residing in the first casing 310a than the quantities of particulate matter 350 residing in each of the second and third casings 320a, 330, respectively. In these examples, the thickness 326a of the second casing 320a and the thickness 336 of the third casing 330 may be the same or different.

FIG. 7 shows the group of stacked casings 300a layered such that an exterior wall 318a of the first casing 310a is in contact with the inner surface 214a of the outsole 210a and an exterior wall 328a of the second casing 320a. The second casing 320a is disposed between the first casing 310a and the third casing 330 such that the an exterior wall 338 of the third casing 330 is in contact with the exterior wall 328a of the second casing 320a on a side opposite the first casing 310a. The exterior wall 338 of the third casing 330 may also contact the bottom surface 222a of the midsole 220a on a side opposite the second casing 320a. The first, second, and third casings 310a, 320a, 330, respectively, may each define a corresponding interior surface 319a, 329a, 339 that surrounds and encloses the particulate matter 350 residing therein. As described with reference to the casings 300 of FIGS. 1-5, in some implementations, the particulate matter 350 (e.g., foam beads) slightly overfills at least one of the casings 310a, 320a, 330 to permit the particulate matter 350 to occupy substantially all voids enclosed by the corresponding interior surface(s) 319a, 329a, 339 thereby expanding each casing 310a, 320a, 330 to provide a substantially uniform and smooth surface profile at the corresponding exterior wall(s) 318a, 328a, 338. The casings 310a, 320a, 330 may also enclose the particulate matter 350 within a single internal region (e.g., single internal region 420 of FIG. 4), within two or more internal regions (e.g., internal regions 410, 412, 414 of FIG. 5), or a combination thereof along their corresponding lengths. Moreover, the quantity of particulate matter 350 contained by each of the casings 310a, 320a, 330 is dependent upon the volume defined by the corresponding casing and/or the density of the particulate matter 350 residing therein. Accordingly, the quantity of particulate matter 350 may be approximately the same in each of the casings 310a, 320a, 330, or at least one of the casings 310a, 320a, 330 may include a different quantity of particulate matter 350 than the other casings 310a, 320a, 330.

At least one of the casings 310a, 320a, 330 may be formed from a flexible material. For example, at least one of the casings 310a, 320a, 330 may be formed from a mesh material and/or the nylon material that forms at least one of the first and second casings 310, 320, respectively, of FIGS. 1-5. Accordingly, the casings 310a, 320a, 330 and the particulate matter 350 may conform to the shape and size of the cavity 240a, thereby creating an interference fit between the inner surface 214a of the outsole 210a, the sidewall 230, the bottom surface 222a of the midsole 220a, and amongst one another when the stacked casings 310a, 320a, 330 are received within the cavity 240a. The midsole 220a may be formed from the flexible material forming the midsole 220 of the article of footwear 10 to provide the midsole with sufficient flexibility, thereby allowing the particulate matter residing within the casings 300a to interact with the profile of the bottom surface of the foot during gradient loading of the sole structure 200a.

In some implementations, the volume of the cavity 240a occupied by the group of three stacked casings 300a is approximately equal to the volume of the cavity 240 occupied by the group of two stacked casings 300 of FIGS. 1-5. Accordingly, the combined thickness 316a, 326a, 336 of the first, second, and third casings 310a, 320a, 330, respectively, is approximately equal to the combined thickness 316, 326 of the first and second casings 310, 320, respectively, of FIGS. 1-5. In a scenario where the combined thickness of the casings 310, 320 of FIGS. 1-5 is approximately the same as the combined thickness of the casings 310a, 320a, 330, the corresponding thicknesses 316a, 326a, 336 of each of the casings 310a, 320a, 330 are less than the corresponding thicknesses 316, 326 of each of the casings 310, 320 of FIGS. 1-5. In this scenario, the smaller thicknesses 316a, 326a, 336 provide a smaller volume for containing quantities of particulate matter 350, thereby confining the quantities of particulate matter 350 within smaller regions enclosed by each of the corresponding casings 310a, 320a, 330. In so doing, movement or shifting of the particulate matter 350 may be reduced relative to the configuration of FIGS. 1-5 as the sole structure 200a compresses during gradient loading applied thereto.

In optional configurations, the sole structure 200a may be modified to include a group of four or more stacked casings received within the cavity 240a without departing from the scope of the present disclosure.

Figure 10:
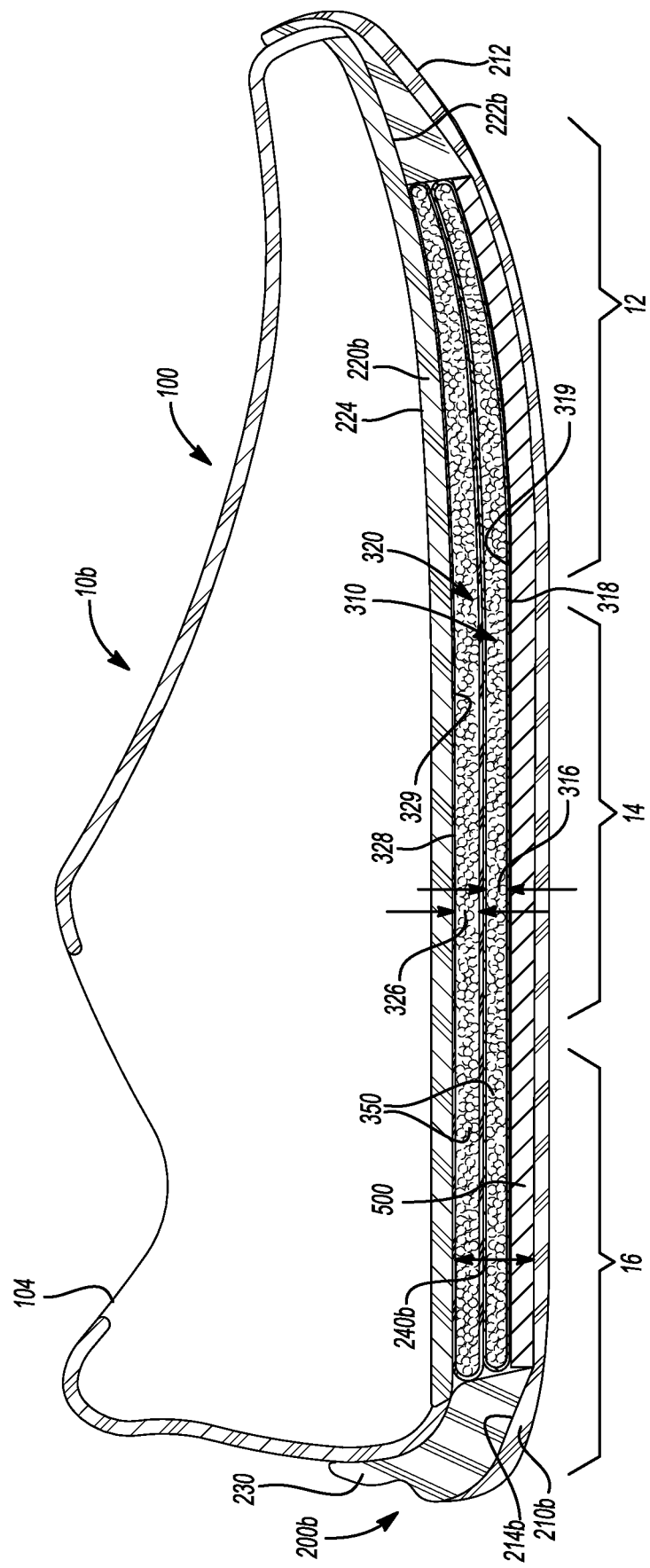
FIG. 10 is a cross-sectional view taken along line 10-10 of FIG. 8 showing a sole structure including a bottom cushioning member disposed on an inner surface of an outsole and a group of stacked casings each containing particulate matter and disposed between the bottom cushioning member and a bottom surface of a midsole.

Referring to FIGS. 8-10, an article of footwear 10b is provided and includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified.

The sole structure 200b may include an outsole 210b and a midsole 220b arranged in the layered configuration. The outsole 210b includes an inner surface 214b disposed on an opposite side of the outsole 210b than the ground-engaging surface 212. The midsole 220b includes a bottom surface 222b disposed on an opposite side of the midsole 220b than the footbed 224. The sidewall 230 bounds a cavity 240b between the bottom surface 222b and the inner surface 214b. The sidewall 230 may separate the bottom surface 222b and the inner surface 214b to define a depth of the cavity 240b.

In some configurations, the group of at least two stacked casings 300 each containing particulate matter 350 are disposed on a bottom cushioning member 500 disposed within the cavity 240b between the outsole 210b and the midsole 220b. The group of at least two stacked casings 300 includes the first and second casings 310, 320, respectively, described above with reference to FIGS. 1-5. In other configurations, three or more stacked casings may be disposed on the bottom cushioning member 500 without departing from the scope of the present disclosure. The bottom cushioning member 500 may reside upon the inner surface 214b of the outsole 210a and include a size and shape that conforms to surface profiles of the sole structure 200b, such as the inner surface 214b and the periphery of the sidewall 230. Accordingly, the first casing 310 may oppose and be located on top of the bottom cushioning member 500 and the second casing 310 may oppose and be located on top of the first casing 310 on a side opposite the bottom cushioning member 500. Accordingly, the bottom cushioning member 500 is disposed between the first casing 310 and the outsole 210b, the first casing 310 is disposed between the bottom cushioning member 500 and the second casing 320, and second casing 320 is disposed between the first casing 310 and the midsole 220b.

In some implementations, the bottom cushioning member 500 includes a slab of polymer foam. In some examples, one or more polymer foam materials, such as ethyl-vinyl-acetate or polyurethane, may form the slab of polymer foam to provide responsive and resilient compressibility under an applied load to attenuate ground-reaction forces.

Optionally, the bottom cushioning member 500 may include a fluid-filled chamber (e.g., bladder) (not shown). In some examples, the fluid-filled chamber defines an interior void that receives a pressurized fluid and provides a durable sealed barrier for retaining the pressurized fluid therein. For instance, the pressurized fluid may be air. A wide range of polymer materials may be utilized to form the fluid-filled chamber. In selecting the polymer materials, engineering properties, such as tensile strength, stretch properties, fatigue characteristics, and dynamic modulus as well as the ability of the materials to prevent the diffusion of the fluid contained by the fluid-filled chamber may be considered. Exemplary materials used to form the fluid-filled chamber may include one or more of thermoplastic urethane, polyurethane, polyester, polyester polyurethane, and polyether polyurethane. The fluid-filled chamber may provide a responsive-type cushioning when under an applied load to attenuate ground-reaction forces.

Referring to FIG. 9, an exploded view of the article of footwear of FIG. 8 shows the sole structure 200b including the bottom cushioning member 500 disposed on the inner surface 214b of the outsole 210b and the group of stacked casings 300 each containing particulate matter 350 disposed between the bottom cushioning member 500 and the bottom surface 222b of the midsole 220b. The casings 300 and the bottom cushioning member 500 define lengths substantially equal to the length of the outsole 210b that extend through the forefoot, mid-foot, and heel portions 12, 14, 16, respectively. The bottom cushioning member 500 is depicted as a slab of polymer foam in the examples; however, a fluid-filled chamber could be substituted in place of the slab of polymer foam to similarly provide responsive-type cushioning. The bottom cushioning member 500 and the two stacked casings 310, 320 disposed thereon, may cooperate to enhance functionality and cushioning characteristics that a conventional midsole provides. For example, compressibility by the particulate matter 350 may provide a soft-type cushioning while compressibility by the bottom cushioning member 500 may provide a responsive-type cushioning. Accordingly, the bottom cushioning member 500 and the particulate matter 350 may cooperate to provide gradient cushioning of the article of footwear 10b that changes as the applied load changes (i.e., the greater the load, the more the bottom cushioning member 500 compresses and, thus, the more responsive the footwear 10b performs).

Referring to FIG. 10, a cross-sectional view taken along line 10-10 of FIG. 8 shows the bottom cushioning member disposed on the inner surface 214b of the outsole 210b and the stacked first and second casings 310, 320, respectively, disposed between the bottom cushioning member 500 and the bottom surface 222b of the midsole 220b when the sole structure 200b is not under an applied load and is at rest. Compared to the depth of the cavity 240 of the sole structure 200 of FIGS. 1-5, the cavity 240b in the sole structure 200b may include a greater depth to accommodate the bottom cushioning member 500. In some examples, the bottom cushioning member 500 is sized and shaped to occupy a portion of empty space located within the cavity 240b. Here, a gap between the bottom cushioning member 500 and the bottom surface 222b defines a remaining portion of empty space within the cavity 240b that receives the stacked casings 310, 320. For example, the exterior wall 318 of the first casing 310 may be in contact with the bottom cushioning member 500 and in contact with the exterior wall 328 of the second casing 320 on a side opposite the bottom cushioning member 500. The exterior wall 328 of the second casing 320 may be in contact with the bottom surface 222b of the midsole 220b on a side opposite the first casing 310. The midsole 220b may be formed from the flexible material forming the midsole 220 of the article of footwear 10 to provide the midsole 220b with sufficient flexibility, thereby allowing the particulate matter residing within the at least two stacked casings 300 to interact with the profile of the bottom surface of the foot during gradient loading of the sole structure 200b. In some configurations, the midsole 220b, or a portion thereof, may be removed to provide direct contact between the bottom surface of the foot and the exterior wall 328 of the second casing 320. In some examples, the quantity of particulate matter 350 slightly overfills (e.g., stuffs) each of the casings 310, 320 causing the corresponding exterior walls 318, 328 to expand outward. In so doing, the quantities of particulate matter 350 may slightly compress when the sole structure 200b is assembled, thereby allowing the casings 310, 320 to occupy substantially all voids enclosed between the sidewall 230, the bottom surface 222b of the midsole 220b, and the bottom cushioning member 500, in a similar fashion as described above with respect to FIGS. 1-5.

During gradient loading of the sole structure 200b, the midsole 220b may translate toward the outsole 210b as the particulate matter 350 residing within each of the casings 310, 320 compresses between the midsole 220b and the bottom cushioning member 500. Here, the bottom cushioning member 500 compresses resiliently between the outsole 210b (and the casings 310, 320) and the midsole 220b. The bottom cushioning member 500, together with the stacked, first and second casings 310, 320, respectively, each containing the particulate matter 350 (e.g., foam beads) and residing on the bottom cushioning member 500, cooperate to provide gradient cushioning to the article of footwear 10b that changes as the applied load changes (i.e., the greater the load, the more the bottom cushioning member 500b compresses, thus, the more responsive the footwear 10b performs). For example, when the sole structure 200b is under load, the particulate matter 350 compressing and/or moving may provide a level of soft-type cushioning during an initial impact of a ground-reaction force while compressibility of the bottom cushioning member 500 may occur after the initial impact to provide responsive-type cushioning. Moreover, the casings 310, 320 cooperate to prevent their corresponding quantities of particulate matter 350 from moving or shifting throughout the sole structure 200b when the sole structure 200b compresses repeatedly.

Figure 13:
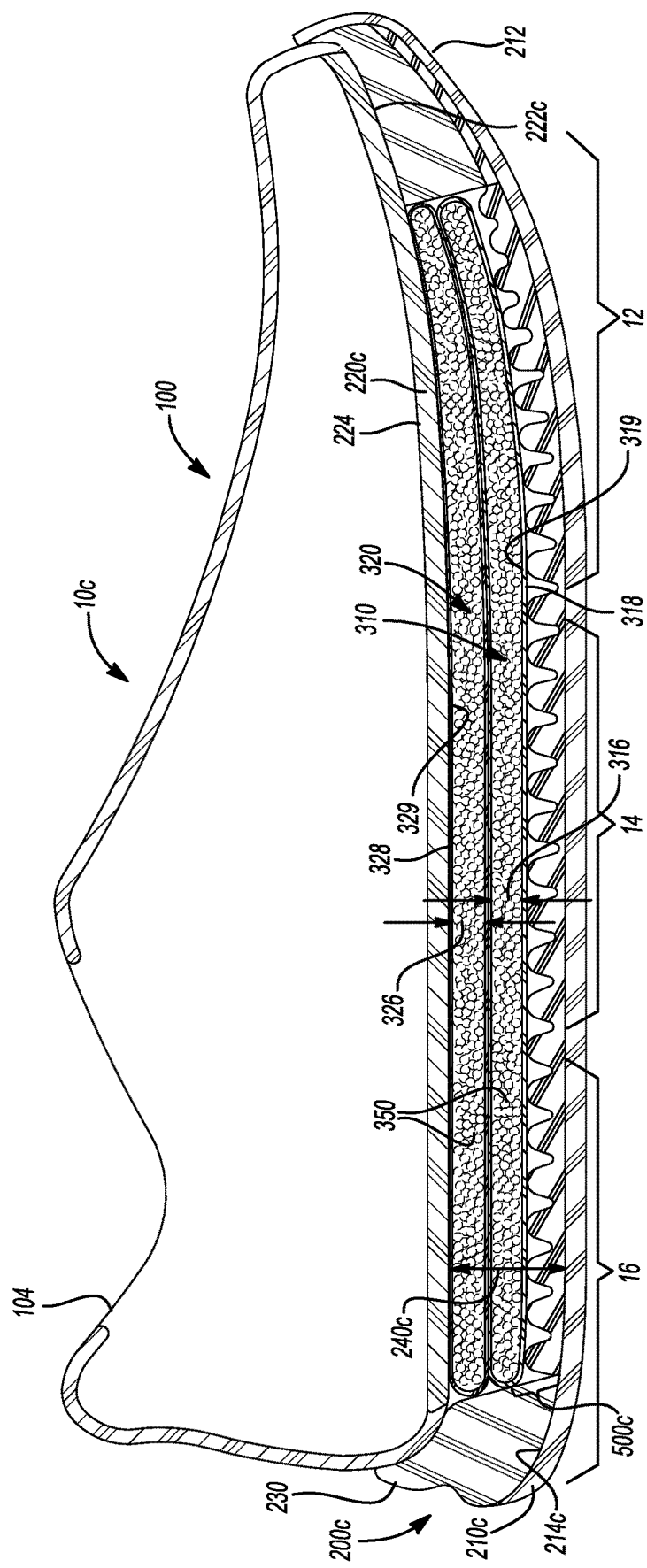
FIG. 13 is a cross-sectional view taken along line 13-13 of FIG. 11 showing a sole structure including a series of projections extending from an inner surface of an outsole and a group of stacked casings each containing particulate matter and disposed between the series of projections and a bottom surface of a midsole.

Referring to FIGS. 11-13, an article of footwear 10c is provided and includes an upper 100 and a sole structure 200c attached to the upper 100. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified.

The sole structure 200c may include an outsole 210c and a midsole 220c arranged in the layered configuration. The outsole 210c includes an interior inner 214c disposed on an opposite side of the outsole 210c than the ground-engaging surface 212. The midsole 220c includes a bottom surface 222c disposed on an opposite side of the midsole 220c than the footbed 224 and may be formed from a flexible material. The sidewall 230 bounds a cavity 240c between the bottom surface 222c and the inner surface 214c. The sidewall 230 may separate the bottom surface 222c and the inner surface 214c to define a depth of the cavity 240c.

In some configurations, the group of at least two stacked casings 300 each containing particulate matter 350 are disposed on a bottom cushioning member 500c located within the cavity 240c between the outsole 210c and the midsole 220c. The group of at least two stacked casings 300 includes the first and second casings 310, 320, respectively, described above with reference to FIGS. 1-5. In other configurations, three or more stacked casings may be disposed on the bottom cushioning member 500c without departing from the scope of the present disclosure. In some implementations, the bottom cushioning member 500c includes a series of projections (hereinafter projections 500c) that extend into the cavity 240c to provide cushioning for the foot as well as to support and limit movement of the stacked, first and second casings 310, 320, respectively, residing in the cavity 240c during use of the footwear 10c. The projections 500c may be formed from one or more polymer foam materials, such as ethyl-vinyl-acetate or polyurethane, to provide resilient compressibility under an applied load to attenuate ground-reaction forces.

FIG. 12 provides an exploded view of the article of footwear 10c of FIG. 11 showing the projections 500c (e.g., bottom cushioning member) extending in a direction from the inner surface 214c of the outsole 210c toward the bottom surface 222c of the midsole 220c. In this implementation, the group of stacked casings 300 each containing particulate matter 350 may be disposed between the projections 500c and the bottom surface 222c of the midsole 220c. For example, the first casing 310 may oppose and stack on top of distal ends of the projections 500c and the second casing 320 may oppose and stack on top of the first casing 310 on a side opposite to the projections 500c. The casings 300 and the projections 500c may extend along the length of the outsole 210c through the forefoot, mid-foot, and heel portions 12, 14, 16, respectively. In some examples, the projections 500c are arranged in repeating rows and each projection 500c is equally spaced apart from adjacent projections 500c. In other examples, the projections 500c are arranged in alternating repeating rows.

Referring to FIG. 13, a cross-sectional view taken along line 13-13 of FIG. 11 shows the projections 500c (e.g., bottom cushioning member) extending from the inner surface 214c and the stacked, first and second casings 310, 320, respectively, disposed between the projections 500c and the bottom surface 222c of the midsole 220c. FIG. 13 shows the projections 500c supporting the stacked, first and second casings 310, 320, respectively, and the projections 500c being spaced from the midsole 220c when the sole structure 200c is not under an applied load and at rest. For example, the exterior wall 318 of the first casing 310 may be in contact with the projections 500c and may be in contact with the exterior wall 328 of the second casing 320 on a side opposite the projections 500c. The exterior wall 328 of the second casing 320 may be in contact with the bottom surface 222c of the midsole 220c on a side opposite the first casing 310. The midsole 220c may be formed from the flexible material forming the midsole 220 of the article of footwear 10 to provide the midsole 220c with sufficient flexibility, thereby allowing the particulate matter 350 residing within the casings 300 to interact with the profile of the bottom surface of the foot during gradient loading of the sole structure 200c. In some configurations, the midsole 220c, or a portion thereof, may be removed to provide direct contact between the bottom surface of the foot and the exterior wall 328 of the second casing 320. In some examples, the quantity of particulate matter 350 slightly overfills (e.g., stuffs) each of the casings 310, 320 causing the corresponding exterior walls 318, 328 to expand outward. In doing so, the quantities of particulate matter 350 may slightly compress when the sole structure 200c is assembled. The first casing 310 may slightly conform and at least partially nest within valleys defined by adjacent projections 500c.

In some implementations, each projection 500c includes a cross-sectional area that decreases as the projections 500c extend from the inner surface 214c to their distal ends (e.g., the cross-sectional area of the projections 500c decreases as the projections 500c extend from the inner surface 214c). In some examples, the projections 500c include a constantly tapered outer surface extending between the inner surface 214c and the distal ends of the projections 500c. In addition to supporting the stacked casings 310, 320, the tapering and decreasing cross-sectional area of the projections 500c also controls compressibility of the projections 500c. Controlling the compressibility of the projections 500c dictates the responsiveness of the cushioning at the corresponding forefoot, mid-foot, and heel portions 12, 14, 16, respectively. For example, smaller loads applied to the tip or distal ends of the projections 500c compresses more easily when the sole structure 200c is under an applied load, as the cross-sectional area of the projections 500c at the tips is relatively small. The remainder of the projections 500c will only compress when a sufficient load is applied to each projection 500c to compress the wider portions located proximate to the inner surface 214c. Accordingly, the projections 500c provide a gradient cushioning affect that increases the degree of compressibility as the applied load increases.

Additionally, the stacked casings 310, 320 each containing the particulate matter 350 are received within the cavity 240c such that the combined thickness 316, 326 of the casings substantially fills any gaps between the bottom surface 222b and the distal ends or tips of the projections 500c. In so doing, forces that deflect the midsole 220c will cause compressibility of the particulate matter 350 residing within the casings 310, 320. The distance or gaps between the bottom surface 222b and the distal ends or tips of the projections 500c may be increased to accommodate greater quantities of the particulate matter 350 and, therefore, increase the level of soft-type cushioning during gradient loading of the sole structure 200c. For example, one or more additional casings each containing particulate matter 350 may be stacked on the first and second casings 310, 320. Compared to the depth of the cavity 240 of the sole structure 200 of FIGS. 1-5, the cavity 240c in the sole structure 200c may include a greater depth to accommodate the projections 500c. Additionally or alternatively, the thickness 316, 326 of at least one of the first and second casings 310, 320, respectively, may be increased so that the corresponding casing(s) 310, 320 can contain a greater quantity of particulate matter 350. In some examples, additional particulate matter 350 (not shown) may be loosely dispersed within the cavity 240c to fill voids (e.g. valleys) between adjoining projections 500c and the exterior surface 318 of the first casing 310 to provide additional cushioning.

During gradient loading of the sole structure 200c, the midsole 220c may translate toward the outsole 210c as the particulate matter 350 residing within each of the casings 310, 320 compresses between the midsole 220c and the projections 500c. Here, the projections 500c may compress while contacting the inner surface 214c as the particulate matter 350 within the stacked, first and second casings 310, 320, respectively, compresses as the load applied to the sole structure 200c increases. As discussed above, compressibility by the particulate matter 350 may provide a soft-type cushioning while compressibility by the projections 500c may provide a responsive-type cushioning. Accordingly, the projections 500c and the particulate matter 350 residing within each of the casings 310, 320 may cooperate to provide gradient cushioning to the article of footwear 10c that changes as the applied load changes (i.e., the greater the load, the more the projections 500c are compressed and, thus, the more responsive the footwear 10c performs).

Referring to FIGS. 14 and 15, an article of footwear 10d is provided and includes an upper 100 and a sole structure 200d attached to the upper 100. In view of the substantial similarity in structure and function of the components associated with the article of footwear 10 with respect to the article of footwear 10d, like reference numerals are used hereinafter and in the drawings to identify like components while like reference numerals containing letter extensions are used to identify those components that have been modified.

The sole structure 200d may include an outsole 210d and a midsole 220d arranged in the layered configuration. The outsole 210d includes an inner surface 214d disposed on an opposite side of the outsole 210d than the ground-engaging surface 212. The midsole 220d includes a bottom surface 222d disposed on an opposite side of the midsole 220d than the footbed 224 and may be formed from a flexible material. The sidewall 230 bounds a cavity 240d between the bottom surface 222d and the inner surface 214d. The sidewall 230 may separate the bottom surface 222d and the inner surface 214d to define a depth of the cavity 240d.

In some implementations, an intermediate cushioning member is disposed between each layer of a group of at least two stacked casings 300d each containing particulate matter 350 and received within the cavity 240d between the inner surface 214d of the outsole 210d and the bottom surface 222d of the midsole 220d. FIG. 15 provides a cross-sectional view taken along line 15-15 of FIG. 14 showing intermediate cushioning members 600 disposed between each layer of a group of three stacked casings 300d each containing particulate matter 350 and received within the cavity 240d between the outsole 210d and the midsole 220c. In other configurations, two stacked casings or four or more stacked, casings may be disposed on the inner surface 214d without departing from the scope of the present disclosure. Thus, the intermediate cushioning members 600 and the group of stacked casings 300d provide alternating repeating layers between a single casing 300d and a single intermediate cushioning member 600.

The cushioning members 600 may include a first intermediate cushioning member 610 and a second intermediate cushioning member 620, and the group of three stacked casings 300d may include a first casing 310d, a second casing 320d, and a third casing 330d. In some implementations, at least one of the intermediate cushioning members 610, 620 includes a slab of polymer foam that may be formed from one or more polymer foam materials, such as ethyl-vinyl-acetate or polyurethane. In some examples, surfaces of the slab(s) of polymer foam may be curved or include indentations or projections. Optionally, at least one of the intermediate cushioning members 610, 620 may include a fluid-filled chamber, as described above with reference to the bottom cushioning member 500 of FIGS. 8-10. While FIG. 15 shows the intermediate cushioning members 610, 620 each including a slab of polymer foam, the intermediate cushioning members 610, 620 may include any combination of a slab of polymer foam and a fluid-filled chamber to provide a responsive-type cushioning when under an applied load to attenuate ground-reaction forces.

FIG. 15 shows the casings 310d, 320d, 330d layered such that an exterior wall 318d of the first casing 310d is in contact with the inner surface 214d of the outsole 210d and the first cushioning member 610. The first cushioning member 610 may be in contact with an exterior wall 328d of the second casing 320d on a side opposite the first casing 310d.

The exterior wall 328d of the second casing 320d may be in contact with the second cushioning member 620 on a side opposite the first cushioning member 610, and the second cushioning member 620 may be in contact with an exterior wall 338d of the third casing 330d on a side opposite the second casing 320d. The exterior wall 338d of the third casing 330d may be in contact with the bottom surface 222d of the midsole 220d on a side opposite the second cushioning member 620. The midsole 220d may be formed from the flexible material forming the midsole 220 of the article of footwear 10 to provide the midsole 220d with sufficient flexibility, thereby allowing the particulate matter 350 residing within the casings 300d to interact with the profile of the bottom surface of the foot during gradient loading of the sole structure 200d. In some configurations, the midsole 220, or a portion thereof, may be removed to provide direct contact between the bottom surface of the foot and the exterior wall 338d of the third casing 330d.

The first, second, and third casings 310d, 320d, 330d, respectively, may each define a corresponding interior surface 319d, 329d, 339d, respectively, that surrounds and encloses the particulate matter 350 residing therein. As described with reference to the casings 300 of FIGS. 1-5, in some implementations, the particulate matter 350 (e.g., foam beads) slightly overfills at least one of the casings 310d, 320d, 330d to permit the particulate matter 350 to occupy substantially all voids enclosed by the corresponding interior surface(s) 319d, 329d, 339d thereby expanding each casing 310d, 320d, 330d to provide a substantially uniform and smooth surface profile at the corresponding exterior wall(s) 318d, 328d, 338d when the sole structure 200d is not under an applied load and at rest. The casings 310d, 320d, 330d may also enclose the particulate matter 350 within a single internal region (e.g., single internal region 420 of FIG. 4), within two or more internal regions (e.g., internal regions 410, 412, 414 of FIG. 5), or a combination thereof along their corresponding lengths. Moreover, the quantity of particulate matter 350 contained by each of the casings 310d, 320d, 330d is dependent upon the volume defined by the corresponding casing and/or the density of the particulate matter 350 residing therein. Accordingly, the quantity of particulate matter 350 may be approximately the same in each of the casings 310d, 320d, 330, or at least one of the casings 310d, 320d, 330 may include a different quantity of particulate matter 350.

During gradient loading of the sole structure 200d, the midsole 220d may translate toward the outsole 210d as the particulate matter 350 residing within each of the casings 310d, 320d, 330d compresses between the midsole 220d and the outsole 210d. Here, each of the intermediate cushioning members 610, 620 compress resiliently between the outsole 210d and the midsole 220d. The intermediate cushioning members 610, 620, together with the stacked, first, second, and third casings 310d, 320d, 330d, respectively, each containing the particulate matter 350 (e.g., foam beads) and disposed on the inner surface 214d, may cooperate to provide gradient cushioning to the article of footwear 10d that changes as the applied load changes (i.e., the greater the load, the more the intermediate cushioning members 610, 620 compress, thus, the more responsive the footwear 10d performs). For example, when the sole structure 200d is under load, the particulate matter 350 compressing may provide a level of soft-type cushioning during an initial impact of a ground-reaction force while compressibility of the intermediate cushioning members 610, 620 may occur after the initial impact to provide responsive-type cushioning. Moreover, the casings 310d, 320d, 330d cooperate to prevent their corresponding quantities of particulate matter 350 from moving or shifting throughout the sole structure 200d when the sole structure 200d compresses repeatedly.

Figure 18:
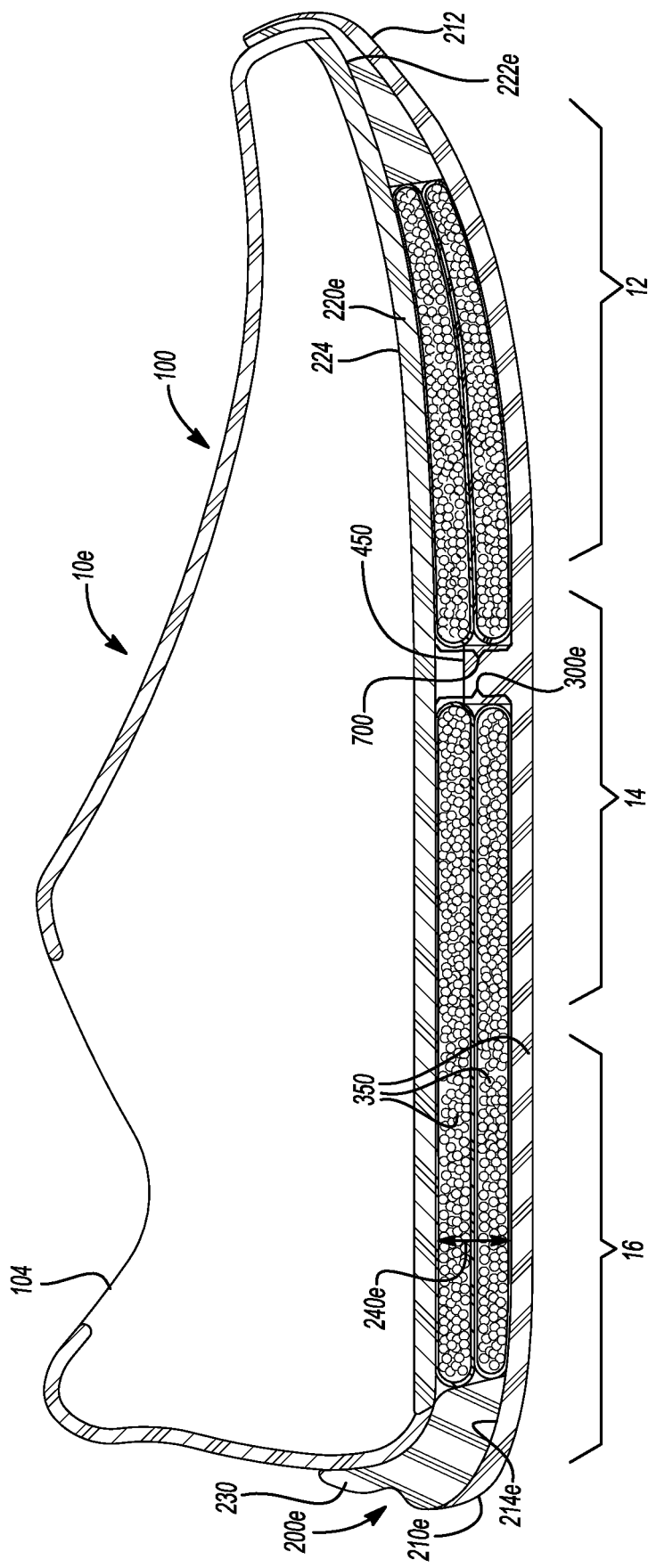
FIG. 18 is a cross-sectional view taken along line 18-18 of FIG. 16 showing a first group of two stacked casings and a second group of two stacked casings each containing particulate matter and received within a cavity between an outsole and a midsole of a sole structure.

Referring to FIGS. 16-18, an article of footwear 10e is provided and includes an upper 100 and a sole structure 200e attached to the upper 100. In view of the substantial similarity in structure and function of the components associated with the article of footwear 10 with respect to the article of footwear 10e, like reference numerals are used hereinafter and in the drawings to identify like components while like reference numerals containing letter extensions are used to identify those components that have been modified.

The sole structure 200e may include an outsole 210e and a midsole 220e arranged in the layered configuration. The outsole 210e includes an inner surface 214e disposed on an opposite side of the outsole 210e than the ground-engaging surface 212. The midsole 220e includes a bottom surface 222e disposed on an opposite side of the midsole 220e than the footbed 224 and may be formed from a flexible material. The sidewall 230 bounds a cavity 240e between the bottom surface 222e and the inner surface 214e. The sidewall 230 may separate the bottom surface 222e and the inner surface 214e to define a depth of the cavity 240e.

In some implementations, a first group of at least two stacked casings 300e each containing particulate matter 350 and a second group of at least two stacked casings 700 reside in the cavity 240e to provide cushioning for the foot during use of the footwear 10e. Similar to the group of casings 300 described with reference to FIGS. 1-5, each casing 300e, 700 may have a thickness that extends substantially perpendicular to the longitudinal axis L of the sole structure 200e, may have a length that extends substantially parallel to the longitudinal axis L of the sole structure 200e, and may be formed from a flexible material, such as a mesh material and/or a nylon material. While the group of casings 300 of the outsole 210 of FIGS. 1-5 each have a length substantially equal to a length of the outsole 210, the length of each casing 300e of the first group and the length of each casing 700 of the second group are both less than the length of the outsole 210e. However, the first and second groups of casings 300e, 700, respectively, may define a combined length substantially equal to the length of the outsole 210e. The lengths of the casings 300e of the first group and the lengths of the casings 700 of the second group may be the same or different.

FIG. 17 provides an exploded view of the article of footwear 10e showing the first group of two, stacked casings 300e each containing the particulate matter 350 and the second group of two, stacked casings 700 received within the cavity 240e between the outsole 210e and the midsole 220e. Either or both of the first and second groups of stacked casings 300e, 700, respectively, may include three or more stacked casings without departing from the scope of the present disclosure. The first group of stacked casings 300e may be disposed proximate to the heel portion 16 and a portion of the mid-foot portion 14 of the outsole 210e and the second group of stacked casings 700 may be disposed proximate to the forefoot portion 12 and a different portion of the mid-foot portion 14 of the outsole 210e. Accordingly, the first group of two, stacked casings 300e may extend through the heel portion 16 and at least a portion of the mid-foot portion 14 while the second group of two, stacked casings 700 may extend through the forefoot portion 12 and at least another portion of the mid-foot portion 14 unoccupied by the casings 300e of the first group.

In some examples, a divider 450 may extend partially into the cavity 240e from the inner surface 214e of the outsole 210e. The divider 450 may restrict movement of the first and second groups of stacked casings 300e, 700, respectively, between specified portions within the cavity 240e of the sole structure 200e. For instance, the examples of FIGS. 17 and 18 show the divider 450 as being located proximate to the mid-foot portion 14 of the outsole 210. Accordingly, the first group of stacked casings 300e may be located to the left of the divider 450 and the second group of stacked casings 700 may be located to the right of the divider 450 relative to the view shown in FIG. 18. While the divider 450 is shown as being located proximate to the mid-foot portion 14, one or more other dividers may additionally or alternatively be located proximate to the forefoot portion 12 and/or the heel portion 16 of the outsole 210e.

Referring to FIG. 18, a cross-sectional view taken along line 18-18 of FIG. 16 shows the first group of stacked casings 300e each containing particulate matter 350 and the second group of stacked casings 700 each containing particulate matter 350 received within the cavity 240e between the outsole 210e and the midsole 220e. The first group of stacked casings 300e may be disposed proximate to the heel portion 16 of the outsole 210e and to the left of the divider 450 relative to the view shown in FIG. 18. The quantity of particulate matter 350 residing within each of the casings 300e of the first group may be the same or different. For example, by varying at least one of the thickness and the density of the particulate matter 350 within the casings 300e, the quantity of particulate matter 350 residing therein can be increased or decreased.

FIG. 18 also shows the second group of stacked casings 700 disposed proximate to the forefoot portion 12 of the outsole 210e and to the right of the divider 450 relative to the view shown in FIG. 18. Similar to the first group of stacked casings 300e, the quantity of particulate matter 350 residing within each of the casings 700 of the second group may be the same or different. For example, by varying at least one of the thickness and the density of the particulate matter 350 within the casings 700, the quantity of particulate matter 350 residing therein can be increased or decreased. Additionally, the total quantity of particulate matter 350 residing in the first group of stacked casings 300e and the total quantity of particulate matter 350 residing in the second group of stacked casings 700 may be the same or different. For example, it may be desirable to increase the level of soft-type cushioning at the heel portion 16 due to an initial impact of a ground-reaction force first occurring at the heel portion 16. Accordingly, a greater quantity of particulate matter 350 may reside at the heel portion 16 by increasing the thickness and/or increasing the density of particulate matter of at least one of the casings 300e of the first group disposed proximate to the heel portion 16.

During gradient loading of the sole structure 200e, the midsole 220e may translate toward the outsole 210e as the particulate matter 350 (e.g., foam beads) residing within each of the casings 300e, 700 of the first and second groups, respectively, compresses between the bottom surface 222e of the midsole 220e and the inner surface 214e of the outsole 210e. Here, the first group of stacked casings 300e and the second group of stacked casings 700 may cooperate to provide gradient cushioning to one or more portions 12, 14, 16 of the sole structure 200e that changes as the applied load changes. For example, during a walking or running movement of the article of footwear 10e, the particulate matter 350 residing in the casings 300e of the first group may compress first in response to an initial impact of the ground-reaction force occurring at the heel portion 16, and the casings 700 of the second group may subsequently compress as the ground-engaging surface 212 rolls for engagement with the ground surface between the heel portion 16 and the forefoot portion 12. The midsole 220e may be formed from the flexible material forming the midsole 220 of the article of footwear 10 to provide the midsole 220e with sufficient flexibility, thereby allowing the particulate matter 350 residing within the casings 300e to interact with the profile of the bottom surface of the foot during gradient loading of the sole structure 200e. In some configurations, the midsole 220e, or a portion thereof, may be removed to provide direct contact between the bottom surface of the foot and the exterior surfaces of the first group of stacked casings 300e and/or the second group of stacked casings 700.

Figure 21:
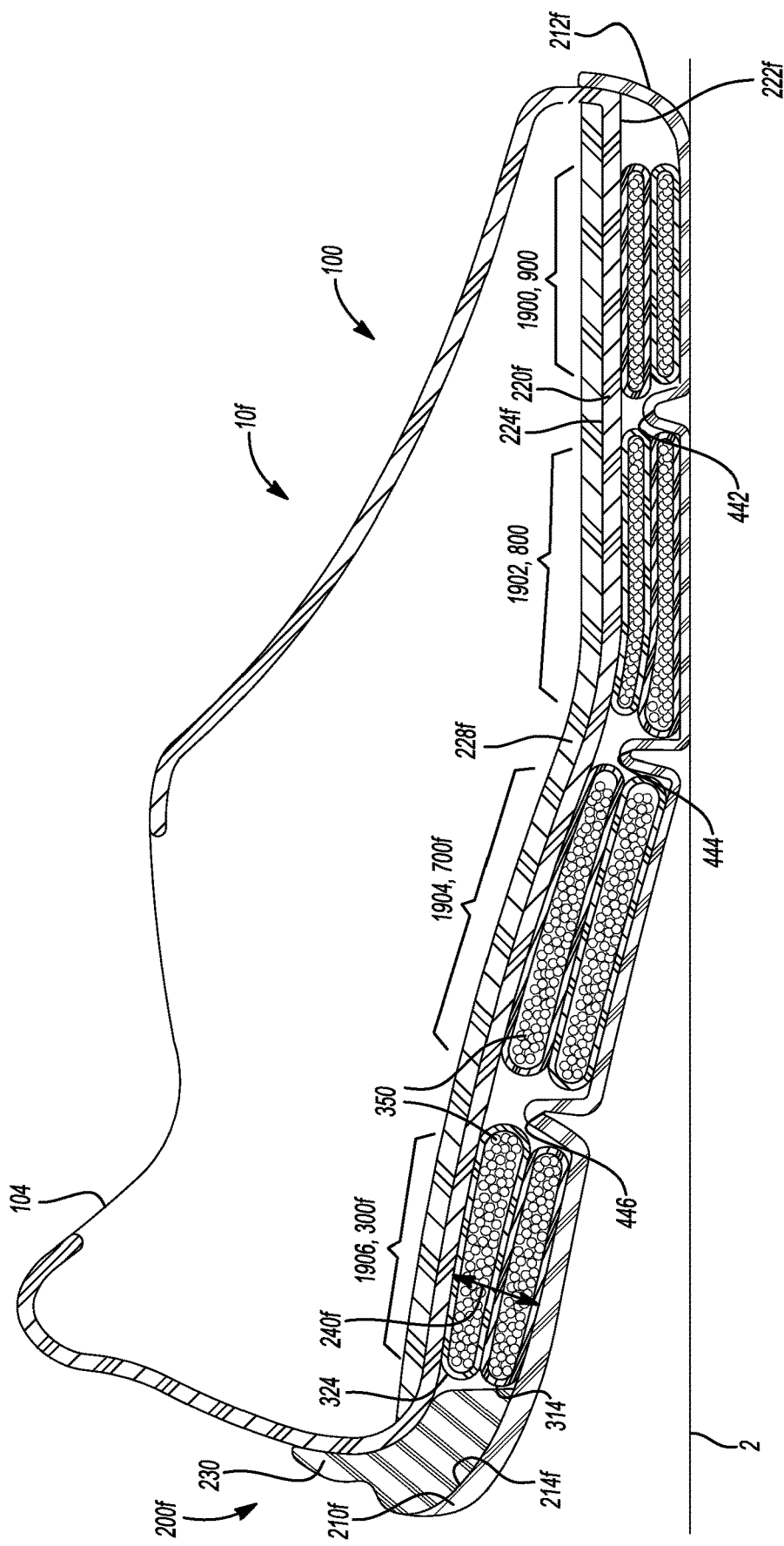
FIG. 21 is a cross-sectional view taken along line 20-20 of FIG. 19 showing four groups of stacked casings each containing particulate matter and received within a cavity between an outsole and a midsole of a sole structure when the sole structure is flexed.

Referring to FIGS. 19-21, an article of footwear 10f is provided and includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified.

The sole structure 200f may include an outsole 210f and a midsole 220f arranged in the layered configuration. The outsole 210f includes an inner surface 214f disposed on an opposite side of the outsole 210f than a ground-engaging surface 212f. The midsole 220f includes a bottom surface 222f disposed on an opposite side of the midsole 220f than a footbed 224f and may be formed from a flexible material. The sole structure 200f may further include an insole 228f (FIGS. 20 and 21) disposed on the footbed 224f under the foot within at least a portion of the interior void 102 of the upper 100. The sidewall 230 bounds a cavity 240f between the bottom surface 222f and the inner surface 214f. The sidewall 230 may separate the bottom surface 222f and the inner surface 214f to define a depth of the cavity 240f.

In some implementations, four groups of at least two stacked casings each containing particulate matter 350 reside in the cavity 240f to provide cushioning for the foot during use of the footwear 10f. For example, the four groups of at least two stacked casings include a first group of stacked casings 300f, a second group of stacked casings 700f, a third groups of stacked casings 800, and a fourth group of stacked casings 900. Similar to the group of casings 300 described with reference to FIGS. 1-5, each casing 300f, 700f, 800, 900 may have a thickness that extends substantially perpendicular to the longitudinal axis L of the sole structure 200f, may have a length that extends substantially parallel to the longitudinal axis L of the sole structure 200f, and may be formed from a flexible material, such as a mesh material and/or a nylon material. Each casing 300f, 700f, 800, 900 of the first, second, third, and fourth groups, respectively, has a length that is less than the length of the outsole 210f. In some examples, the lengths of the casings 300f, 700f, 800, 900 of at least one of the groups is different. In other examples, the lengths of the casings 300f, 700f, 800, 900 in each of the groups is approximately the same.

FIGS. 20 and 21 are cross-sectional views taken along line 20-20 of FIG. 19 showing the four groups of two stacked casings 300f, 700f, 800, 900 each containing the particulate matter 350 and received within the cavity 240f between the outsole 210f and the midsole 220f. More specifically, FIGS. 20 and 21 show the ground-engaging surface 212f of the outsole 210f engaging a ground surface 2 when the sole structure 200f is not under load (FIG. 20) and when the sole structure 200f is under load (FIG. 20). Either one of the first, second, third, and fourth groups of stacked casings 300f, 700f, 800, 900, respectively, may include three or more stacked casings without departing from the scope of the present disclosure. The midsole 220f may be formed from the flexible material forming the midsole 220 of the article of footwear 10 to provide the midsole 220f with sufficient flexibility, thereby allowing the particulate matter 350 residing within the casings 300f, 700f, 800, 900 to interact with the profile of the bottom surface of the foot during gradient loading of the sole structure 200f. In some configurations, the midsole 220f, or a portion thereof, may be removed to provide direct contact between the bottom surface of the foot and at least one of the four groups of two stacked casings, 300f, 770f, 800, and 900.

In some implementations, the outsole 210f defines a series of grooves 442, 444, 446 extending between the lateral and medial sides 18, 20 and also projecting from the inner surface 214f in a direction toward the midsole 220f. Accordingly, each groove 442, 444, 446 bends and curves in the direction toward the midsole 220f to form a projection or divider that divides the cavity 240f into two or more regions. The examples show the grooves 442, 444, 446 terminating within the cavity 240f such that a gap separates the distal ends of the grooves 442, 444, 446 and the bottom surface 222f of the midsole 220f. Conversely, other configurations may include one or more of the grooves 442, 444, 446 terminating at a corresponding point of contact with the bottom surface 222f. One groove 442 may be located proximate to the forefoot portion 12, another groove 444 may be located proximate to the mid-foot portion 14, and another groove 446 may be located proximate to the heel portion 16 of the outsole 210f.

In some configurations, a toe region 1900 is formed to the right of the groove 442, a forefoot region 1902 is formed between the grooves 442 and 444, a mid-foot region 1904 is formed between the grooves 444 and 446, and a heel region 1906 is formed to the left of the groove 446 relative to the views shown in FIGS. 20 and 21. The first group of stacked casings 300f may be disposed within the heel region 1906; the second group of stacked casings 700f may be disposed within the mid-foot region 1904; the third group of stacked casings 800 may be disposed within the forefoot region 1902; and the fourth group of stacked casings 900 may be disposed within the toe region 1900. In addition to forming the corresponding regions 1900-1906 for each of the groups of stacked casings 300f, 700f, 800, 900, the grooves 442, 444, 446 may restrict the casings 300f, 700f, 800, 900 from moving or shifting between the adjoining regions 1900-1906 as the sole structure 200f compresses under gradient loading applied thereto.

In some examples, the grooves 442-444 are flexible to form corresponding flexion regions that enhance the ability of the outsole 210f to flex, bend, or otherwise deform, when the sole structure 200f is under load, such as during walking, running or jumping. For example, FIG. 21 shows the groove 444 flexing to bend the mid-foot and heel portions 14, 16 of the sole structure 200f about the groove 444, and off of the ground surface 2, when a load is applied to the sole structure 200f, such as during a walking or running stride. In this example, the groove 446 prevents the first group of stacked casings 300f disposed in the heel region 1906 from shifting or migrating into the adjoining mid-foot region 1904, while the groove 444 prevents the second group of stacked casings 700f disposed in the mid-foot region 1904 from shifting or migrating into the adjoining forefoot region 1902.

During gradient loading of the sole structure 200f, the midsole 220f may translate toward the outsole 210f as the particulate matter 350 (e.g., foam beads) residing within each of the casings 300f, 700f 800, 900 of the first, second, third, and fourth groups, respectively, compresses between the bottom surface 222f of the midsole 220f and the inner surface 214f of the outsole 210f. Here, the groups of stacked casings 300f, 700f, 800, 900 may cooperate to provide gradient cushioning to one or more regions 1900-1906 of the sole structure 200f that changes as the applied load changes. For example, during a walking or running movement of the article of footwear 10f, the particulate matter 350 residing in the casings 300f of the first group may compress first in response to an initial impact of the ground-reaction force occurring at the heel region 1906 and, thereafter, the particulate matter 350 residing within each of the casings 700f, 800, 900 may sequentially compress to provide fluid cushioning during gradient loading of the sole structure 200f as the ground-engaging surface 212f rolls for engagement with the ground surface 2 between the heel portion 16 and the forefoot portion 12. In addition to soft-type cushioning provided by compressing the particulate matter 350 within each of the casings 300f, 700f, 800, 900, the grooves 442, 444, 446 may include rigidity characteristics to provide responsive-type cushioning when the sole structure 200f compresses.

Referring to FIGS. 22 and 23, an article of footwear 10g is provided and includes an upper 100 and a sole structure 200g attached to the upper 100. In view of the substantial similarity in structure and function of the components associated with the article of footwear 10 with respect to the article of footwear 10g, like reference numerals are used hereinafter and in the drawings to identify like components while like reference numerals containing letter extensions are used to identify those components that have been modified.

The sole structure 200g may include an outsole 210g and a sidewall 230g extending from the perimeter of the outsole 210g and attaching to the upper 100. The outsole 210g includes the inner surface 214 and the ground-engaging surface 212 disposed on an opposite side of the outsole 210g than the inner surface 214. Conversely to the configuration of the article of footwear 10 of FIGS. 1-5, the article of footwear 10g does not include a midsole. Instead, the article of footwear 10g includes a cavity 240g bounded by the inner surface of the sidewall 230g and the inner surface 214 of the outsole 210g. The length of the sidewall 230g extending from the inner surface 214 may define a depth of the cavity 240g. Compared to the depth of the cavity 240 of the sole structure 200 of FIGS. 1-5, the cavity 240g of the sole structure 200g may include a greater depth, as the midsole 220 or stroble is absent.

In some implementations, the group of at least two stacked casings 300 each containing particulate matter 350 reside in the cavity 240g to provide cushioning for the foot during use of the footwear 10g. FIG. 23 provides a cross-sectional view taken along line 23-23 of FIG. 22 showing the group of two stacked casings 300 each containing particulate matter 350 and received within the cavity 240g on the inner surface 214 of the outsole 210g. The group of at least two stacked casings 300 includes the first and second casings 310, 320, respectively, described above with reference to the article of footwear 10 of FIGS. 1-5. In other configurations, three or more stacked casings may be disposed on the inner surface 214 of the outsole 210g without departing from the scope of the present disclosure.

The first casing 310 may oppose and be located on top of the inner surface 214 and the second casing 320 may oppose and be located on top of the first casing 310 on a side opposite the inner surface 214. Compared to the sole structure 200 of FIGS. 1-5, the second casing 320 is disposed between the first casing 310 and the bottom surface of the foot, as the midsole 220 or stroble is absent. For example, FIG. 23 shows the casings 310, 320 stacked in the layered configuration such that the exterior wall 318 of the first casing 310 is in contact with both the inner surface 214 of the outsole 210*a* and the exterior wall 328 of the second casing 320. The exterior wall 328 of the second casing 320 may directly contact the bottom surface of a foot when the article of footwear 10*g* is in use on a side opposite the first casing 310 such that the second casing 320 is disposed between the first casing 310 and the bottom surface of the foot. In some examples, a flexible insole (not shown) may rest between the bottom surface of the foot and the exterior wall 328 of the second casing 320. If an insole is not utilized, the exterior wall 328 forms a foot-receiving surface that directly receives a foot of a user when the article of footwear 10*g* is in use.

Referring to FIGS. 24 and 25, an article of footwear 10*h* is provided and includes an upper 100 and a sole structure 200*h* attached to the upper 100. In view of the substantial similarity in structure and function of the components associated with the article of footwear 10 with respect to the article of footwear 10*h*, like reference numerals are used hereinafter and in the drawings to identify like components while like reference numerals containing letter extensions are used to identify those components that have been modified.

The sole structure 200*h* may include an outsole 210*h* and a midsole 220*h* arranged in the layered configuration. The outsole 210*h* includes an inner surface 214*h* disposed on an opposite side of the outsole 210*h* than the ground-engaging surface 212. The midsole 220*h* may be formed from the flexible material forming the midsole 220 of the article of footwear 10 and includes a bottom surface 222*h* disposed on an opposite side of the midsole 220*h* than the footbed 224. The sidewall 230 bounds a cavity 240*h* between the bottom surface 222*h* and the inner surface 214*h*. The sidewall 230 may separate the bottom surface 222*h* and the inner surface 214*h* to define a depth of the cavity 240*h*.

In some configurations, a group of at least two stacked casings 310*h*, 320*h* each containing particulate matter 350 are disposed on a bottom cushioning member 500*h* located within the cavity 240*h* between the outsole 210*h* and the midsole 220*h*. The at least two stacked casings 310*h*, 320*h* are substantially identical to the first and second casings 310, 320, respectively, described above with reference to FIGS. 1-5, except that the casings 310*h*, 320*h* only extend through the forefoot portion 12 and the mid-foot portion 14 of the sole structure 200*h*.

In other configurations, three or more stacked casings may be disposed on the bottom cushioning member 500*h* without departing from the scope of the present disclosure. In some implementations, the bottom cushioning member 500*h* includes a first portion defining a series of projections 502 that extend into the cavity 240*c* through the forefoot portion 12 and the mid-foot portion 16 and a second portion defining a slab 504 that substantially fills the cavity 240*h* at the heel portion 16. The projections 502 are substantially identical to the projections 500*c* described above with reference to FIGS. 11-13, except that the projections 502 only extend through the forefoot portion 12 and the mid-foot portion 14 of the outsole 200*h*. The projections 502 and the slab 504 portions of the cushioning member 500*h* may cooperate to provide cushioning for the foot as well as to support and limit movement of the stacked, first and second casings 310*h*, 320*h*, respectively, residing in the cavity 240*h* during use of the footwear 10*h*. The projections 502 and the slab 504 may be formed from one or more polymer foam materials, such as ethyl-vinyl-acetate or polyurethane, to provide resilient compressibility under an applied load to attenuate ground-reaction forces.

FIG. 25 provides a cross-sectional view taken along line 25-25 of FIG. 24 showing the projections 502 extending through the forefoot portion 12 and the mid-foot portion 14 in a direction from the inner surface 214*h* of the outsole 210*h* toward the bottom surface 222*h* of the midsole 220*h*. The slab 504 may occupy the depth of the cavity 240*h* between the bottom surface 222*h* and the inner surface 214*h*. In these implementations, the stacked casings 310*h*, 320*h* each containing particulate matter 350 may be bounded by the slab 504, the projections 502, and the bottom surface 222*h* of the midsole 220*h*. For example, the first casing 310*h* may oppose and stack on top of distal ends of the projections 502 and the second casing 320*h* may oppose and stack on top of the first casing 310*h* on a side opposite the projections 502. In some examples, the projections 502 are arranged in repeating rows and each projection 502 is equally spaced apart from adjacent projections 502. In other examples, the projections 502 are arranged in alternating, repeating rows.

FIG. 25 shows the projections 502 supporting the stacked, first and second casings 310*h*, 320*h*, respectively, and as being spaced from the midsole 220*h* when the sole structure 200*h* is not under an applied load and is at rest. For example, an exterior wall 318*h* of the first casing 310*h* may be in contact with the projections 502 and may be in contact with an exterior wall 328*h* of the second casing 320*h* on a side opposite the projections 502. The exterior wall 328*h* of the second casing 320*h* may be in contact with the bottom surface 222*h* of the midsole 220*h* on a side opposite the first casing 310*h*. In some configurations, the midsole 220*h*, or a portion thereof, may be removed to provide direct contact between the bottom surface of the foot and the exterior wall 328*h* of the second casing 320*h*. In this configuration, the exterior wall 328*h* defines a foot-receiving surface that directly receives a foot during use of the article of footwear 10*h*. In some examples, the quantity of particulate matter 350 slightly overfills (e.g., stuffs) each of the casings 310*h*, 320*h* causing the corresponding exterior walls 318*h*, 328*h* to expand outward. In doing so, the quantities of particulate matter 350 may slightly compress when the sole structure 200*h* is assembled. The first casing 310*h* may slightly conform and at least partially nest within valleys defined by adjacent projections 502.

During gradient loading of the sole structure 200*h*, the midsole 220*h* may translate toward the outsole 210*h* as the particulate matter 350 residing within each of the casings 310*h*, 320*h* compresses between the midsole 220*c* and the projections 502 and as the slab 504 compresses at the heel portion 16 between the midsole 220*h* and the outsole 210*h*. Here, the projections 502 may compress as the particulate matter 350 within the stacked, first and second casings 310*h*, 320*h*, respectively, compresses and the load applied to the sole structure 200*h* increases. As discussed above, compressibility by the particulate matter 350 may provide a soft-type cushioning while compressibility by the projections 502 and/or the slab 504 of the cushioning member 500*h* may provide a responsive-type cushioning. Accordingly, the projections 502, the slab 504, and the particulate matter 350 residing within each of the casings 310*h*, 320*h* may cooperate to provide gradient cushioning to the article of footwear 10*h* that changes as the applied load changes (i.e., the greater the load, the more the projections 502 and/or the slab 504 portion are compressed and, thus, the more responsive the footwear 10h performs).

Referring to FIGS. 26 and 27, an article of footwear 10i is provided and includes an upper 100 and a sole structure 200i attached to the upper 100. In view of the substantial similarity in structure and function of the components associated with the article of footwear 10 with respect to the article of footwear 10i, like reference numerals are used hereinafter and in the drawings to identify like components while like reference numerals containing letter extensions are used to identify those components that have been modified.

The sole structure 200i may include an outsole 210i and a midsole 220i arranged in the layered configuration. The outsole 210i includes an inner surface 214i disposed on an opposite side of the outsole 210i than the ground-engaging surface 212. The midsole 220i may be formed from the flexible material forming the midsole 220 of the article of footwear 10 and includes a bottom surface 222i disposed on an opposite side of the midsole 220i than the footbed 224. The sidewall 230 bounds a cavity 240i between the bottom surface 222i and the inner surface 214i. The sidewall 230 may separate the bottom surface 222i and the inner surface 214i to define a depth of the cavity 240i.

In some implementations, a cushioning member 500i and a group of at least two stacked casings 310i, 320i each containing particulate matter 350 reside in the cavity 240i to provide cushioning for the foot during use of the footwear 10g. FIG. 27 provides a cross-sectional view taken along line 27-27 of FIG. 26 showing the stacked casings 310i, 320i each containing particulate matter 350, and the cushioning member 500i, received within the cavity 240i on the inner surface 214i of the outsole 210i. Where the article of footwear 10 of FIGS. 1-5 include the first casing 310 and the second casing 320 extending through the forefoot, mid-foot, and heel portions 12, 14, 16, respectively, the stacked casings 310i, 320i of the article of footwear 10i extend through the forefoot portion 12 and a portion of the mid-foot portion 14 and the cushioning member 500i occupies the remainder of the cavity 500i. In other configurations, three or more stacked casings may be disposed on the inner surface 214i of the outsole 210i without departing from the scope of the present disclosure.

The first casing 310i may oppose and be located on top of the inner surface 214i and the second casing 320i may oppose and be located on top of the first casing 310 on a side opposite the inner surface 214i. Specifically, the casings 310i, 320i may be stacked in the layered configurations such that an exterior wall 318i of the first casing 310 is in contact with both the inner surface 214i and an exterior wall 328i of the second casing 320i. The exterior wall 328i of the second casing 320i may contact the bottom surface 222i of the midsole 220i. In some configurations, the midsole 220i, or a portion thereof, may be removed to provide direct contact between the bottom surface of the foot and the exterior wall 328i of the second casing 320i such that the exterior wall 328i defines a foot-receiving surface that directly receives a foot during use of the article of footwear 10i. The cushioning member 500i may include a slab of polymer foam that occupies the depth of the cavity 240i through the heel portion 16 and the remaining portion of the mid-foot portion 14 unoccupied by the stacked casings 310i, 320i. In this implementation, the stacked casings 310i, 320i each containing particulate matter 350 may be bounded by the cushioning member 500i. In some examples, an end of the cushioning member 500i opposing the first ends 312i, 322i of the casings 310i, 320i may include a sloped surface 510 to allow a portion of the exterior wall 318i of the second casing 320i to nest thereon. Accordingly, a length of the first casing 310i between the first end 312i and a second end 314i may be less than a length of the second casing 320i between the first end 322i and a second end 324i.

During gradient loading of the sole structure 200i, the midsole 220i may translate toward the outsole 210i as the particulate matter 350 residing within each of the casings 310i, 320i compresses between the midsole 220i and the outsole 210i while the cushioning member 500i (e.g., slab of polymer foam) compresses at the heel portion 16 between the midsole 220i and the outsole 210i. As discussed above, compressibility by the particulate matter 350 may provide a soft-type cushioning while compressibility by the cushioning member 500i may provide a responsive-type cushioning. Accordingly, the cushioning member 500i and the particulate matter 350 residing within each of the casings 310i, 320i may cooperate to provide gradient cushioning to the article of footwear 10i that changes as the footwear 10i rolls for engagement with the ground surface (i.e., ground-reaction forces at the heel portion 16 cause the cushioning member 500i to compress and provide responsive-type cushioning while the transfer of the ground-reaction forces toward the forefoot portion 12 causes the particulate matter 350 to compress and provide soft-type cushioning).

Figure 28:
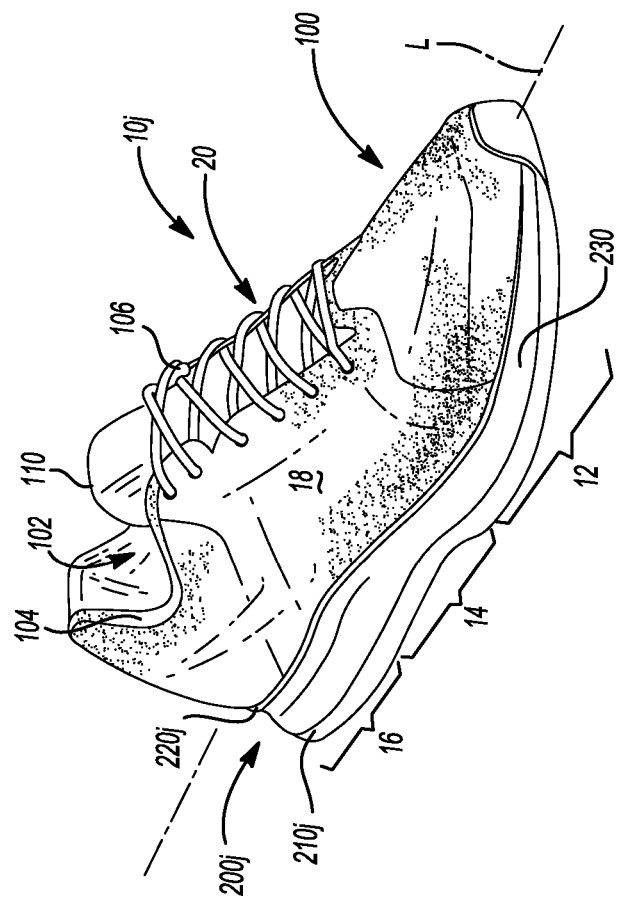
FIG. 28 is a top perspective view of an article of footwear in accordance with principles of the present disclosure.
Figure 29:
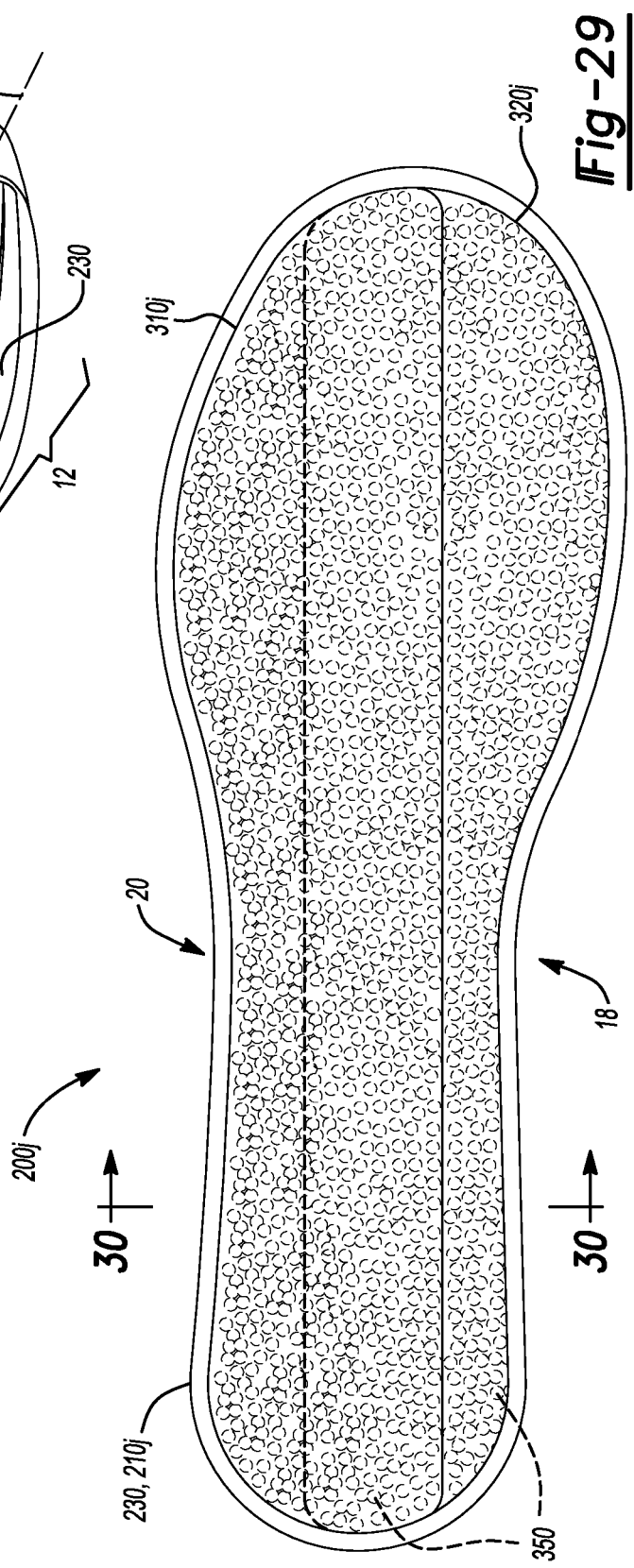
FIG. 29 is a top view of a sole structure of the article of footwear of FIG. 28 showing two overlapped casings each containing particulate matter and received on an inner surface of an outsole.
Figure 30:
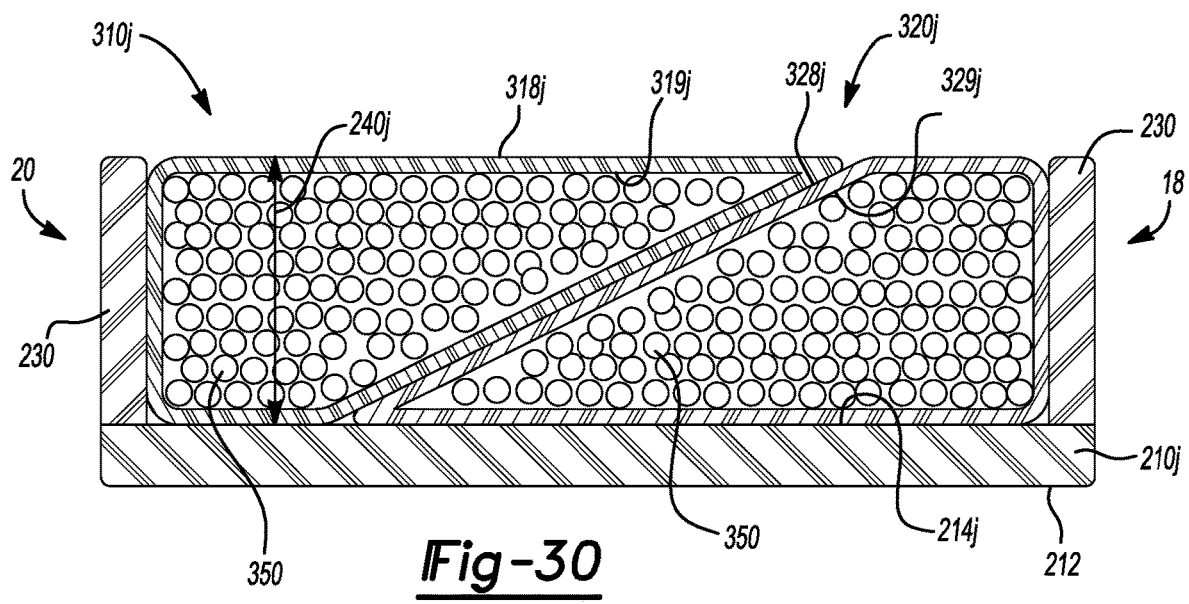
FIG. 30 is a cross-sectional view taken along line 30-30 of FIG. 29 showing the overlapped casings having wedge-shaped cross-sections.

Referring to FIGS. 28-30, an article of footwear 10j is provided and includes an upper 100 and a sole structure 200j attached to the upper 100. In view of the substantial similarity in structure and function of the components associated with the article of footwear 10 with respect to the article of footwear 10j, like reference numerals are used hereinafter and in the drawings to identify like components while like reference numerals containing letter extensions are used to identify those components that have been modified.

The sole structure 200j may include an outsole 210j and a midsole (not shown) arranged in the layered configuration. The outsole 210j includes an inner surface 214j disposed on an opposite side of the outsole 210j than the ground-engaging surface 212. The midsole may be formed from the flexible material forming the midsole 220 of the article of footwear 10. The sidewall 230 bounds a cavity 240j between the midsole and the inner surface 214j. The sidewall 230 may separate the midsole and the inner surface 214j to define a depth of the cavity 240j in a similar fashion as described above with respect to the article of footwear 10.

In some implementations, a group of at least two stacked casings 310j, 320j each containing particulate matter 350 reside in the cavity 240j to provide cushioning for the foot during use of the footwear 10j. FIG. 29 provides a top view of the sole structure 200j of FIG. 28 with the midsole omitted from view. FIG. 29 shows the first casing 310j extending from the sidewall 230 at the medial side 20 and terminating before the sidewall 230 at the lateral side 18. On the other hand, the second casing 320j extends from the sidewall 230 at the lateral side 18 and terminates before the sidewall 230 at the medial side 20. The first casing 310j may overlap or be stacked on a portion of the second casing 320j within an interior region of the cavity 240j such that the first casing 310j and the second casing 320j cooperate to substantially fill the cavity 240j. Thus, the lateral side 18 of the footwear 10j may be associated with soft-type cushioning provided by particulate matter 350 residing in the second casing 320j and the medial side 20 of the footwear 10j may be associated with soft-type cushioning provided by particulate matter 350 residing in the first casing 310j. The density of particulate matter 350 may vary or be the same within each of the casings 310*j*, 320*j* to tune or adjust the responsiveness of the sole structure 200*j* at the lateral side 18 and at the medial side 20.

Referring to FIG. 30, a cross-sectional view taken along line 30-30 of FIG. 29 shows the first casing 310*j* and the second casing 320*j* each containing respective quantities of particulate matter 350 and residing in the cavity 240*j*. Here, the casings 310*j*, 320*j* include substantially wedge-shaped cross-sections that interlock with each other such that a tapered surface of the first casing 310*j* rests on a corresponding tapered surface of the second casing 320*j* to substantially fill the cavity 240*j*. The first casing 310*j* may oppose and be located on top of the inner surface 214*j* proximate to the medial side 20 while the second casing 320*j* may oppose and be located on top of the remainder of the inner surface 214*j* and proximate to the lateral side 18. FIG. 30 shows the wedge-shaped first casing 310*j* defining a volume that decreases from the medial side 20 of the footwear 10*j* toward the lateral side 18. For example, an exterior wall 318*j* and an interior wall 319*j* of the first casing 310*j* taper into the cavity 240*j* from the inner surface 214*j* toward the midsole. By contrast, the wedge-shaped second casing 320*j* defines a volume that increases from the medial side 20 of the footwear 10*j* toward the lateral side 20. For example, an exterior wall 328*j* and an interior wall 329*j* of the second casing 320*j* taper into the cavity 240*j* from the midsole to the inner surface 214*j* at the point where the walls 318*j*, 319*j* of the first casing 310*j* begin to taper into the cavity 240*j*. The tapered surfaces of the casings 310*j*, 320*j* may align with each other such that the first casing 310*j* and the second casing 320*j* are restricted from shifting relative to one another. Namely, the first casing 310*j* may nest with the second casing 320*j* at the tapered walls of each casing 310*j*, 320*j* to restrict relative movement therebetween.

The volumes defined by each casing 310*j*, 320*j* may be the same or different. FIG. 33 shows the exterior walls 318*j*, 328*j* extending substantially collinear with each other along the inner surface 214*j* of the outsole 210*j* and also along the top of the cavity 240*k* proximate to the midsole (not shown). In addition to preventing shifting of the casings 310*j*, 320*j* relative to one another, the wedge-shaped cross-sections of the partially stacked and overlapping casings 310*j*, 320*j* may restrict migration of the associated quantities of particulate matter 350 residing within each of the casings 310*j*, 320*j*.

During gradient loading of the sole structure 200*j*, the midsole may translate toward the outsole 210*j* as the particulate matter 350 residing within one or both of the casings 310*j*, 320*j* compresses between the midsole and the outsole 210*j*. For example, a ground reaction-force directed toward the lateral side 18 of the footwear 10*j* may mainly compress the particulate matter 350 residing in the second casing 320*j*. Conversely, a ground-reaction force applied to the medial side 20 may mainly compress the particulate matter 350 residing in the first casing 310*j*. Forces applied substantially normal to the casings 310*j*, 320*j* may equally compress the particulate matter 350 disposed within each casing 310*j*, 320*j*.

Referring to FIGS. 31-33, an article of footwear 10*k* is provided and includes an upper 100 and a sole structure 200*k* attached to the upper 100. In view of the substantial similarity in structure and function of the components associated with the article of footwear 10 with respect to the article of footwear 10*k*, like reference numerals are used hereinafter and in the drawings to identify like components while like reference numerals containing letter extensions are used to identify those components that have been modified.

The sole structure 200*k* may include an outsole 210*k* and a midsole (not shown) arranged in the layered configuration. The outsole 210*k* includes an inner surface 214*kj* disposed on an opposite side of the outsole 210*k* than the ground-engaging surface 212. The midsole may be formed from the flexible material forming the midsole 220 of the article of footwear 10. The sidewall 230 bounds a cavity 240*k* between the midsole and the inner surface 214*k*. The sidewall 230 may separate the midsole and the inner surface 214*k* to define a depth of the cavity 240*k* in a similar fashion as described above with respect to the article of footwear 10.

In some implementations, a group of at least two stacked casings 310*k*, 320*k* each containing particulate matter 350 reside in the cavity 240*k* to provide cushioning for the foot during use of the footwear 10*k*. FIG. 32 provides a top view of the sole structure 200*k* of FIG. 31 with the midsole omitted from view. FIG. 32 shows the first casing 310*k* received on the inner surface 214*k* of the outsole 210*k* between the lateral side 18 and the medial side 20 of the sidewall 230 and extending through the forefoot, mid-foot, and heel portions 12, 14, 16, respectively. The second casing 320*k* may be stacked on the first casing 310*k* at the heel portion 16. The first casing 310*k* and the second casing 320*k* may cooperate to substantially occupy the cavity 240*k* at the heel portion 16, while the first casing 310*k* may substantially occupy the remaining volume of the cavity 240*k*.

Referring to FIG. 33, a cross-sectional view taken along line 33-33 of FIG. 32 shows the first casing 310*k* and the second casing 320*k* each containing respective quantities of particulate matter 350 and residing in the cavity 240*k*. An interior wall 319*k* of the first casing 310*k* and an interior wall 329*k* of the second casing 320*k* bound the respective quantities of particulate matter 350. Here, the casings 310*j*, 320*j* include substantially wedge-shaped cross-sections that interlock with each other with the first casing 310*k* defining a nesting void that receives the second casing 320*k*. As such, the second casing 320*k* nests with the first casing 310*k* to restrict relative movement therebetween. An exterior wall 318*k* of the first casing 310*k* is in contact with the inner surface 214*k* of the outsole 210*k*, an exterior wall 328*k* of the second casing 320*k*, and portions of the midsole (not shown) proximate to the sidewall 230 at the lateral side 18 and the medial side 20. An exterior wall 328*k* of the second casing 320*k* is in contact with the remaining portion of the midsole between the portions of the midsole in contact with the exterior wall 318*k* of the first casing 310*k*.

FIG. 33 shows the exterior wall 318*k* of the first casing 310*k* defining a medial tapered surface 311 and a lateral medial surface 313 that converge toward one another to define the nesting void that receives the second casing 320*k*. In some examples, the medial tapered surface 311 tapers into the cavity 240*k* from a location spaced inward from the sidewall 230 at the medial side 20 and the lateral tapered surface 313 tapers into the cavity 240*k* from a location spaced inward from the sidewall 230 at the lateral side 18. The medial tapered surface 311 and the lateral tapered surface 313 may converge into one another within the cavity 240*k* at a location proximate to the inner surface 214*k* of the outsole 210*k* and substantially centered between the lateral side 18 and the medial side 20. Stitching 227 may secure the tapered surfaces 311, 313 together at the point of convergence. The tapered surfaces 311, 313 of the first casing 310*k* cooperate to define the nesting void such that corresponding tapered surfaces 321, 323 defined by the exterior wall 328*k* of the second casing 320*k* align and contact corresponding ones of the tapered surfaces 311, 313 of the first casing 310*k*. Accordingly, the second casing 320*k* may nest on the first casing 310$k$ within the cavity 240$k$ at an interior region of the heel portion 16 spaced inward from the sidewall 230. In addition to defining the nesting void that receives the second casing 320$k$, the tapered surfaces 311, 313 provide the first casing 310$k$ with a volume that decreases away from the sidewall 230 at the lateral side 18 and the medial side 20. Thus, the decreasing volume may prevent the particulate matter 350 residing within the first casing 310$k$ from shifting between the lateral and medial sides 18, 20, respectively.

During gradient loading of the sole structure 200$k$, a ground-reaction force occurring at the heel portion 16 of the footwear 10$k$ may compress the particulate matter 350 residing within each of the casings 310$k$, 320$k$. The density and/or type of particulate matter 350 may vary or be the same within each of the casings 310$k$, 320$k$ to provide a desired level of soft-type cushioning at the heel region 16. For example, cushioning at the heel portion 16 may be tailored to a particular use or activity by adjusting the density and/or type of particulate matter 350 disposed within the second casing 320$k$ such that at least one of the density and type of the particulate matter 350 disposed within the second casing 320$k$ is different than that of the first casing 310$k$.

The casings 310$k$, 320$k$ may cooperate to restrict unfettered movement of the particulate matter 350 within the casings 310$k$, 320$k$ at the heel portion 16 during repeated compressions. Namely, the particulate matter 350 disposed within the second casing 320$k$ is confined to the second casing 320$k$ and, as such, is confined to the heel portion 16, as the second casing 320$k$ is surrounded by the first casing 310$k$ and is therefore restricted from moving relative thereto. Further, the particulate matter 350 disposed within the first casing 310$k$ is likewise restricted due in large part to the shape of the first casing 310$k$ in the area of the second casing 320$k$. Accordingly, the particulate matter 350 disposed with the first casing 310$k$ and the particulate matter 350 disposed within the second casing 320$k$ is not permitted to move unfettered from the heel portion 16 toward the forefoot portion 12.

The following Clauses provide an exemplary configuration for the sole structure for an article of footwear described above.

Clause 1: An article of footwear comprising an upper and a midsole attached to the upper and including a footbed and a bottom surface disposed on an opposite side of the midsole than the footbed. The outsole having a ground-engaging surface, an inner surface disposed on an opposite side of the outsole than the ground-engaging surface, and a wall extending from the ground-engaging surface and surrounding the outsole. The at least two casings each containing particulate matter and having a thickness extending substantially perpendicular to a longitudinal axis of the outsole, the at least two casings arranged in a layered configuration and received within a cavity bounded by the wall of the outsole and between the bottom surface and the inner surface.

Clause 2: The article of footwear of any of Clause 1, wherein the at least two casings include approximately the same quantity of the particulate matter.

Clause 3: The article of footwear of Clause 1, wherein the at least two casings include different quantities of the particulate matter.

Clause 4: The article of footwear of any of the proceeding Clauses, wherein walls of at least one of the casings are secured together to define at least two segments each containing a quantity of the particulate matter.

Clause 5: The article of footwear of Clause 4, wherein the at least two segments include approximately the same quantity of the particulate matter.

Clause 6: The article of footwear of Clause 4, wherein the at least two segments include different quantities of the particulate matter.

Clause 7: The article of footwear of Clause 1, wherein the thicknesses of the at least two casings are different.

Clause 8: The article of footwear of Clause 1, wherein the thicknesses of the at least two casings are approximately the same.

Clause 9: The article of footwear of any of the preceding Clauses, wherein at least one of the at least two casings is formed from a flexible material.

Clause 10: The article of footwear of any of the preceding Clauses, wherein at least one of the at least two casings is formed from a mesh material.

Clause 11: The article of footwear of any of the preceding Clauses, wherein at least one of the at least two casings is formed from a nylon material.

Clause 12: The article of footwear of any of the preceding Clauses, wherein the particulate matter includes foam beads.

Clause 13: The article of footwear of Clause 12, wherein the foam beads include a substantially spherical shape.

Clause 14: The article of footwear of Clause 12, wherein the foam beads include a substantially polygonal shape.

Clause 15: The article of footwear of Clause 12, wherein the foam beads include approximately the same size and shape.

Clause 16: The article of footwear of Clause 12, wherein the foam beads include at least one of a different size and shape.

Clause 17: The article of footwear of Clause 12, wherein a size and shape of the foam beads is approximately the same in each of the at least two casings.

Clause 18: The article of footwear of Clause 12, wherein at least one of a size and shape of the foam beads is different in at least one of the at least two casings.

Clause 19: The article of footwear of any of the preceding Clauses, further comprising a bottom cushioning member residing within the cavity between the inner surface of the outsole and the at least two casings.

Clause 20: The article of footwear of Clause 19, wherein the bottom cushioning member includes polymer foam.

Clause 21: The article of footwear of Clause 19, wherein the bottom cushioning member includes a fluid-filled chamber.

Clause 22: The article of footwear of Clause 19, wherein the bottom cushioning member includes a series of projections extending from the inner surface of the outsole in a direction toward the bottom surface of the midsole, the series of projections being spaced apart from the bottom surface.

Clause 23: The article of footwear of any of the proceeding Clauses, further comprising an intermediate cushioning member disposed between the at least two casings.

Clause 24: The article of footwear of any of the preceding Clauses, wherein the at least two casings have a length substantially equal to a length of the outsole.

Clause 25: The article of footwear of Clause 1, wherein the at least two casings have a length that is less than a length of the outsole.

Clause 26: The article of footwear of Clause 25, wherein the at least two casings includes a first casing, a second casing, a third casing, and a fourth casing, the first casing and the second casing being disposed proximate to a heel portion of the outsole and the third casing and the fourth casing being disposed proximate to at least one of a forefoot portion and a mid-foot portion of the outsole.

Clause 27: An article of footwear comprising an upper and an outsole attached to the upper and having a ground-engaging surface, an inner surface disposed on an opposite side of the outsole than the ground-engaging surface, and a wall extending from the ground-engaging surface and surrounding the outsole. The midsole having a footbed and a bottom surface disposed on an opposite side of the midsole than the footbed and opposing the inner surface of the outsole to define a cavity therebetween and bounded by the wall of the outsole. The first casing containing particulate matter, the first casing received within the cavity and opposing the inner surface of the outsole. The second casing containing particulate matter, the second casing received within the cavity and disposed between the first casing and the midsole.

Clause 28: The article of footwear of Clause 27, wherein walls of at least one of the first casing and the second casing are secured together to define at least two segments each containing approximately the same quantity of the particulate matter.

Clause 29: The article of footwear of Clause 27, wherein walls of at least one of the first casing and the second casing are secured together to define at least two segments each containing different quantities of the particulate matter.

Clause 30: The article of footwear of any of the preceding Clauses, wherein the first casing and the second casing are formed from a flexible material.

Clause 31: The article of footwear of any of the preceding Clauses, wherein the first casing and the second casing are formed from a mesh material.

Clause 32: The article of footwear of any of the preceding Clauses, wherein the first casing and the second casing are formed from a nylon material.

Clause 33: The article of footwear of any of the preceding Clauses, wherein the particulate matter includes foam beads.

Clause 34: The article of footwear of Clause 33, wherein the foam beads include at least one of a substantially spherical shape and a substantially polygonal shape.

Clause 35: The article of footwear of Clause 33, wherein the foam beads include approximately the same size and shape.

Clause 36: The article of footwear of Clause 33, wherein the foam beads include at least one of a different size and shape.

Clause 37: The article of footwear of Clause 33, wherein a size and shape of the foam beads is approximately the same in the first casing and the second casing.

Clause 38: The article of footwear of Clause 33, wherein at least one of a size and shape of the foam beads is different in the first casing and the second casing.

Clause 39: The article of footwear of any of the preceding Clauses, further comprising a bottom cushioning member residing within the cavity between the first casing and the inner surface of the outsole.

Clause 40: The article of footwear of Clause 39, wherein the bottom cushioning member includes at least one of polymer foam, a fluid-filled bladder, and a series of projections extending from the inner surface of the outsole and in a direction toward the bottom surface of the midsole, the series of projections being spaced apart from the bottom surface.

Clause 41: The article of footwear of any of the proceeding Clauses, further comprising an intermediate cushioning member disposed between the first casing and the second casing.

Clause 42: The article of footwear of any of the preceding Clauses, wherein the first casing and the second casing have a length substantially equal to a length of the outsole.

Clause 43: The article of footwear of Clause 26, further comprising a third casing received within the casing and opposing the inner surface of the outsole and a fourth casing received within the cavity and disposed between the third casing and the midsole. The third casing and the fourth casing being disposed proximate to at least one of a forefoot portion and a mid-foot portion of the outsole and the first casing and the second casing being disposed proximate to a heel portion of the outsole.

Clause 44: The article of footwear of Clause 26, wherein the second casing has a different thickness extending in a direction substantially perpendicular to a longitudinal axis of the outsole than the first casing.

Clause 45: The article of footwear of any of the preceding Clauses, wherein the first casing and the second casing include different quantities of the particulate matter.

Clause 46: An article of footwear comprising an upper and an outsole attached to the upper and having a ground-engaging surface, an inner surface disposed on an opposite side of the outsole than the ground-engaging surface, and a wall extending from the ground-engaging surface and surrounding the outsole. The midsole having a footbed and a bottom surface disposed on an opposite side of the midsole than the footbed and opposing the inner surface of the outsole to define a cavity therebetween and bounded by the wall of the outsole. The first quantity of particulate matter received within the cavity and the second quantity of particulate matter received within the cavity and separated from the first quantity of particulate matter, the second quantity of particulate matter disposed between the first quantity of particulate matter and the bottom surface of the midsole.

Clause 47: The article of footwear of Clause 46, wherein the first quantity of particulate matter is received within a first casing.

Clause 48: The article of footwear of any of the preceding Clauses, wherein the second quantity of particulate matter is received within a second casing.

Clause 49: The article of footwear of any of the preceding Clauses, wherein the first casing and the second casing are formed from at least one of a flexible material, a mesh material, and a nylon material.

Clause 50: The article of footwear of any of the preceding Clauses, wherein the particulate matter includes foam beads having at least one of a substantially spherical shape and a substantially polygonal shape.

Clause 51: The article of footwear of Clause 50, wherein the foam beads include approximately the same size and shape.

Clause 52: The article of footwear of Clause 50, wherein the foam beads include at least one of a different size and shape.

Clause 53: The article of footwear of Clause 50, wherein a size and shape of the foam beads is approximately the same in the first casing and the second casing.

Clause 54: The article of footwear of Clause 50, wherein at least one of a size and shape of the foam beads is different in the first casing and the second casing.

Clause 55: The article of footwear of any of the preceding Clauses, further comprising a bottom cushioning member residing within the cavity between the first quantity of particulate matter and the inner surface of the outsole.

Clause 56: The article of footwear of Clause 55, wherein the bottom cushioning member includes at least one of polymer foam, a fluid-filled bladder, and a series of projections extending from the inner surface of the outsole in a direction toward the bottom surface of the midsole, the series of projections being spaced apart from the bottom surface.

Clause 57: The article of footwear of Clause 46, wherein the first quantity of particulate matter and the second quantity of particulate matter are respectively received within flexible casings.

Clause 58: A method of making an article of footwear. The method comprising providing a cavity between a footbed and an outsole, providing a first casing containing particulate matter within the cavity and adjacent to the outsole, and providing a second casing containing particulate matter within the cavity and between the first casing and the footbed.

Clause 59: The method of Clause 58, wherein providing the first casing and the second casing within the cavity includes providing the first casing with a different thickness than the second casing, as measured in a direction extending substantially perpendicular to a longitudinal axis of the outsole.

Clause 60: The method of Clause 58, wherein providing the first casing and the second casing within the cavity includes providing the first casing with substantially the same thickness as the second cavity, as measured in a direction extending substantially perpendicular to a longitudinal axis of the outsole.

Clause 61: The method of any of the preceding Clauses, further comprising forming the first casing and the casing from a flexible material.

Clause 62: The method of any of the preceding Clauses, further comprising forming the first casing and the casing from a mesh material.

Clause 63: The method of any of the preceding Clauses, further comprising forming the first casing and the casing from a nylon material.

Clause 64: The method of any of the preceding Clause, further comprising securing walls of the first casing together and securing walls of the second casing together to define at least two segments within each of the first casing and the second casing.

Clause 65: The method of Clause 64, further comprising providing the at least two segments with approximately the same quantity of the particulate matter.

Clause 66: The method of Clause 64, further comprising providing the at least two segments with different quantities of the particulate matter.

Clause 67: The method of any of the preceding Clauses, wherein providing the first casing containing particulate matter and providing the second casing containing the particulate matter includes providing the first casing and the second casing with a quantity of foam beads having at least one of a substantially spherical shape and a substantially polygonal shape.

Clause 68: The method of Clause 67, wherein providing the quantity of foam beads comprises providing foam beads that include approximately the same size and shape.

Clause 69: The method of Clause 67, wherein providing the quantity of foam beads comprises providing foam beads that include at least one of a different size and shape.

Clause 70: The method of any of the preceding Clauses, further comprising inserting a bottom cushioning member into the cavity between the first casing and the inner surface of the outsole.

Clause 71: The method of Clause 58, wherein inserting the bottom cushioning member includes inserting at least one of a foam cushioning member and a fluid-filled cushioning member.

Clause 72: The method of any of the preceding Clauses, further comprising inserting an intermediate cushioning member between the first casing and the second casing.

Clause 73: The method of Clause 72, wherein inserting the intermediate cushioning member between the first casing and the second casing includes inserting at least one of a polymer foam and a fluid-filled bladder between the first casing and the second casing.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
an upper;
a midsole attached to the upper and including a footbed and a bottom surface disposed on an opposite side of the midsole than the footbed;
an outsole having a ground-engaging surface, an inner surface disposed on an opposite side of the outsole than the ground-engaging surface, and a wall extending from the ground-engaging surface and surrounding the outsole; and
at least two casings each containing particulate matter and having a thickness extending substantially perpendicular to a longitudinal axis of the outsole, the at least two casings arranged in a layered configuration and received within a cavity bounded by the wall of the outsole and between the bottom surface and the inner surface, walls of at least one of the casings being secured together to define at least two segments each containing a quantity of the particulate matter.

2. The article of footwear of any of claim 1, wherein the at least two casings include approximately the same quantity of the particulate matter.

3. The article of footwear of claim 1, wherein the at least two casings include different quantities of the particulate matter.

4. The article of footwear of claim 1, wherein the at least two segments include approximately the same quantity of the particulate matter.

5. The article of footwear of claim 1, wherein the at least two segments include different quantities of the particulate matter.

6. The article of footwear of claim 1, wherein the thicknesses of the at least two casings are different.

7. The article of footwear of claim 1, wherein the thicknesses of the at least two casings are approximately the same.

8. The article of footwear of claim 1, wherein at least one of the at least two casings is formed from at least one of a flexible material, a mesh material, and a nylon material.

9. The article of footwear of claim 1, wherein the particulate matter includes foam beads.

10. An article of footwear comprising:
an upper;

an outsole attached to the upper and having a ground-engaging surface, an inner surface disposed on an opposite side of the outsole than the ground-engaging surface, and a wall extending from the ground-engaging surface and surrounding the outsole;

a midsole having a footbed and a bottom surface disposed on an opposite side of the midsole than the footbed and opposing the inner surface of the outsole to define a cavity therebetween and bounded by the wall of the outsole;

a first casing containing particulate matter, the first casing received within the cavity and opposing the inner surface of the outsole; and a second casing containing particulate matter, the second casing received within the cavity and disposed between the first casing and the midsole, walls of at least one of the first casing and the second casing are secured together to define at least two segments each containing a quantity of the particulate matter.

11. The article of footwear of claim 10, wherein the at least two segments each contain approximately the same quantity of the particulate matter.

12. The article of footwear of claim 10, wherein the at least two segments each contain different quantities of the particulate matter.

13. The article of footwear of claim 10, wherein the first casing and the second casing are formed from at least one of a flexible material, a mesh material, and a nylon material.

14. The article of footwear of claim 10, wherein the particulate matter includes foam beads.

15. The article of footwear of claim 14, wherein the foam beads include at least one of a substantially spherical shape and a substantially polygonal shape.

16. The article of footwear of claim 14, wherein the foam beads include approximately the same size and shape.

17. The article of footwear of claim 14, wherein the foam beads include at least one of a different size and shape.

18. The article of footwear of claim 14, wherein a size and shape of the foam beads is approximately the same in the first casing and the second casing.

19. The article of footwear of claim 14, wherein at least one of a size and shape of the foam beads is different in the first casing and the second casing.

* * * * *